United States Patent
Sasaki

(10) Patent No.: US 6,462,915 B1
(45) Date of Patent: Oct. 8, 2002

(54) SYSTEM AND METHOD FOR MANUFACTURING A COMPOSITE TYPE THIN FILM MAGNETIC HEAD HAVING A READING MAGNETORESISTIVE EFFECTIVE TYPE THIN FILM MAGNETIC HEAD AND A WRITING INDUCTIVE TYPE THIN FILM MAGNETIC HEAD THAT ARE STACKED

(75) Inventor: Yoshitaka Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/406,851

(22) Filed: Sep. 29, 1999

(30) Foreign Application Priority Data

Oct. 1, 1998 (JP) .......................................... 10-279893

(51) Int. Cl.[7] .............................. G11B 5/127; G11B 5/33

(52) U.S. Cl. ....................................... 360/317; 360/320

(58) Field of Search .................................. 360/317, 318, 360/318.1, 319, 320, 321, 322

(56) References Cited

U.S. PATENT DOCUMENTS 5,751,522 A * 5/1998 Yamada et al. ............. 360/126
5,907,459 A   5/1999 Shouji et al. ................ 360/322

* cited by examiner

Primary Examiner—David Davis
(74) Attorney, Agent, or Firm—Oliff & Berridge PLC

(57) ABSTRACT

For improving a thermal asperity of a magnetoresistive effective type thin film magnetic head, a thin film magnetic head is provided which does not deteriorate an insulation between leads for a magnetoresistive element and a top and bottom shields even if a shield gap layer is thinner and can read reproducing signals precisely by reducing the resistances of the leads. A first and a second conductive layers are provided in insulating separation by an insulating layer between a substrate and a bottom shield, and are connected to one ends of a magnetoresistive layer via a first and a second conductive plugs and a first and a second drawing electrode layers, respectively. The other ends of the first and second conductive layers are connected to contacting pads for connection to an external circuit via a pair of conductive layers formed at the same time when a third and a fourth conductive plugs and the bottom pole are formed or when a thin film coil is formed.

17 Claims, 22 Drawing Sheets

FIG_1A
PRIOR ART
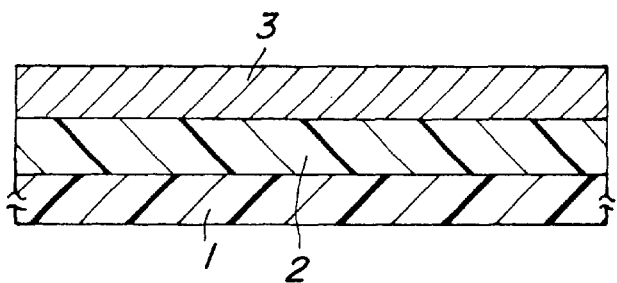
FIG_1B
PRIOR ART
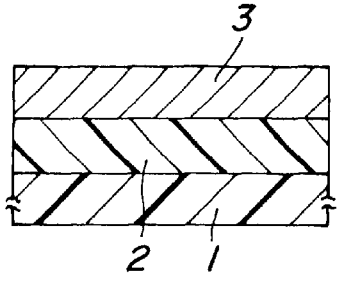
FIG_2A
PRIOR ART
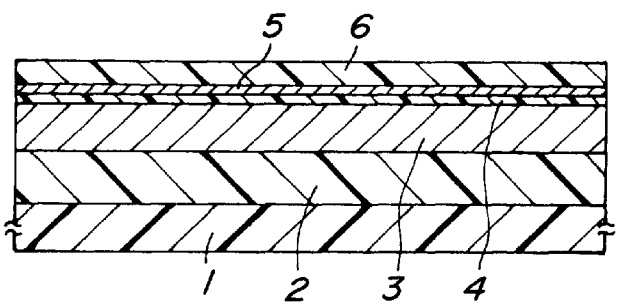
FIG_2B
PRIOR ART
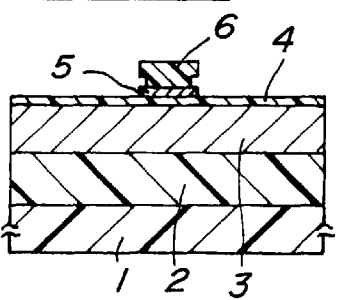
FIG_3A
PRIOR ART
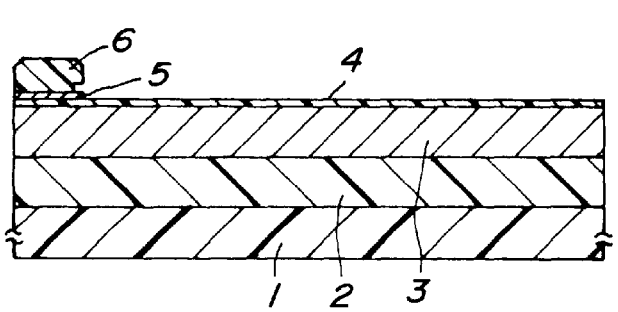
FIG_3B
PRIOR ART
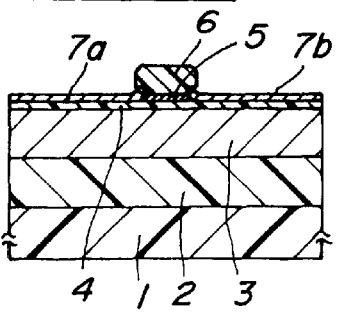
FIG_4A
PRIOR ART
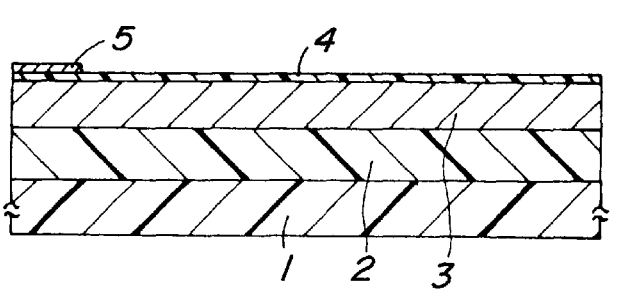
FIG_4B
PRIOR ART
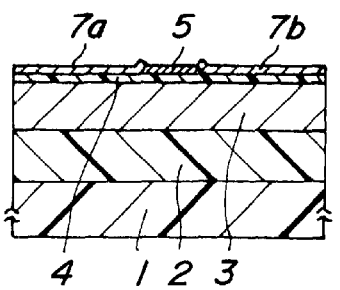

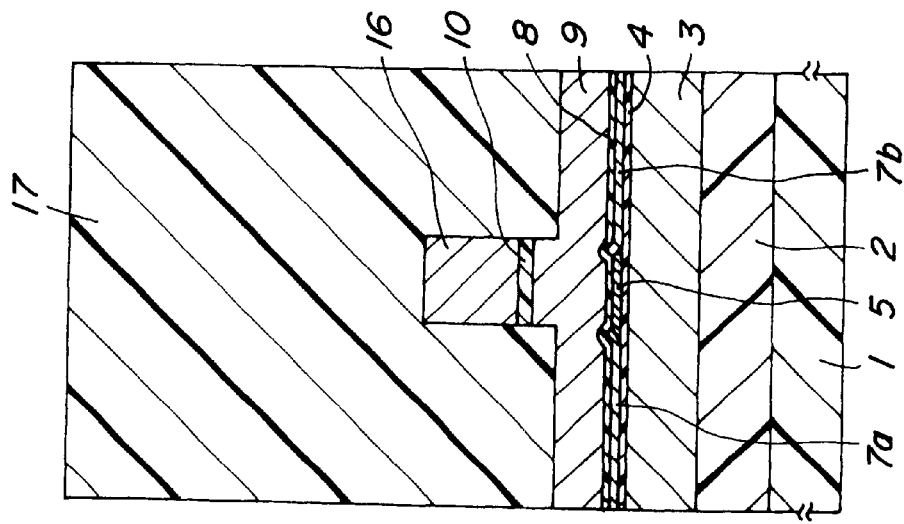
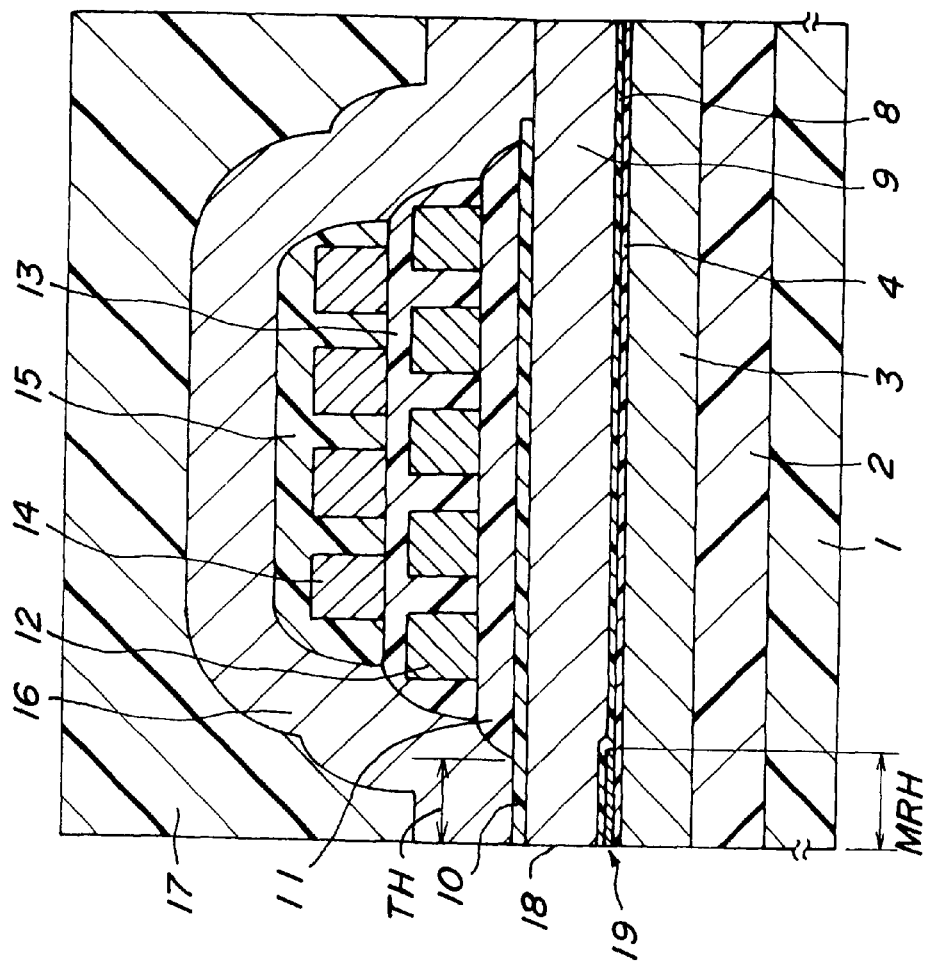

FIG_10A
FIG_10B
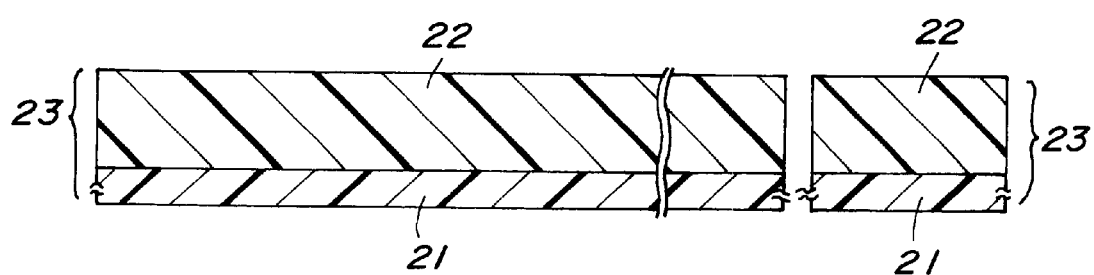
FIG_11A
FIG_11B
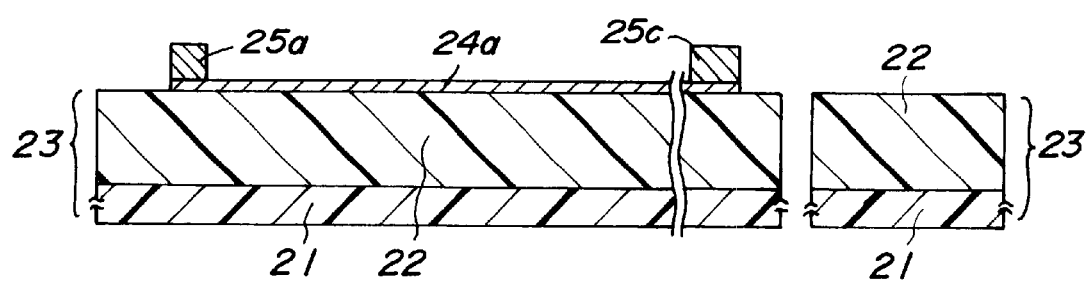

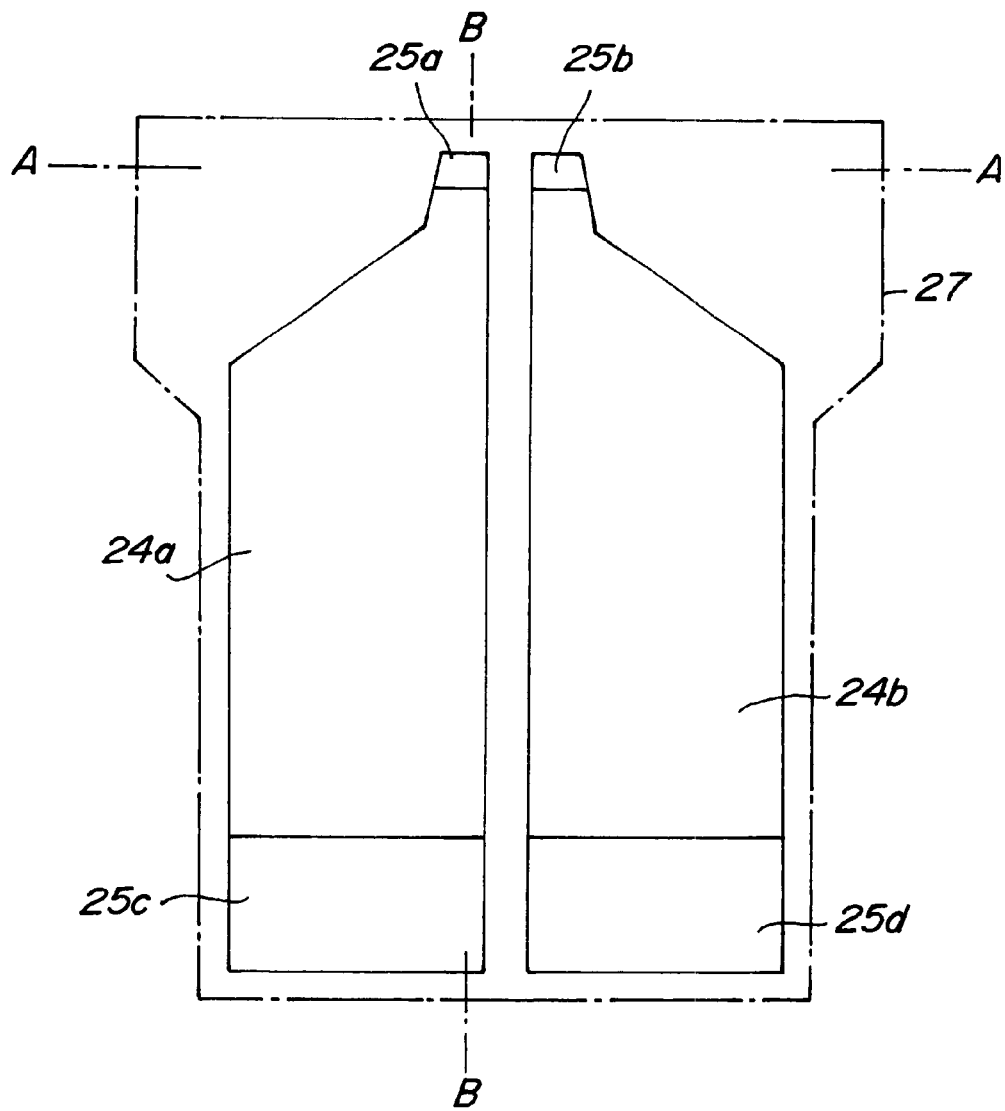
FIG_12A
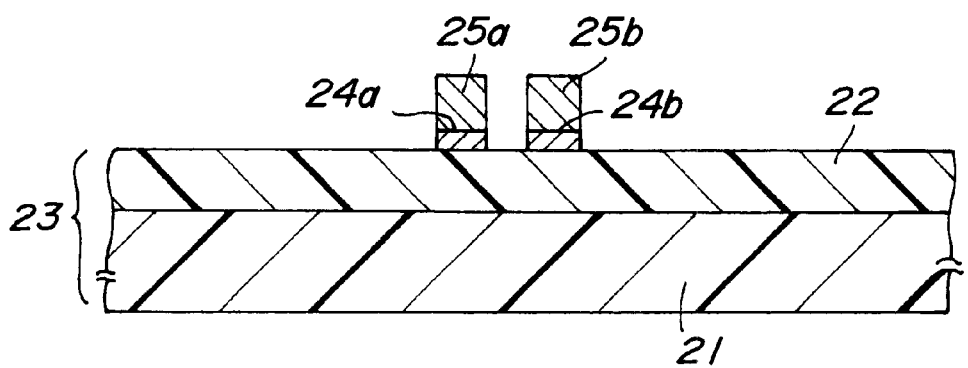
FIG_12B

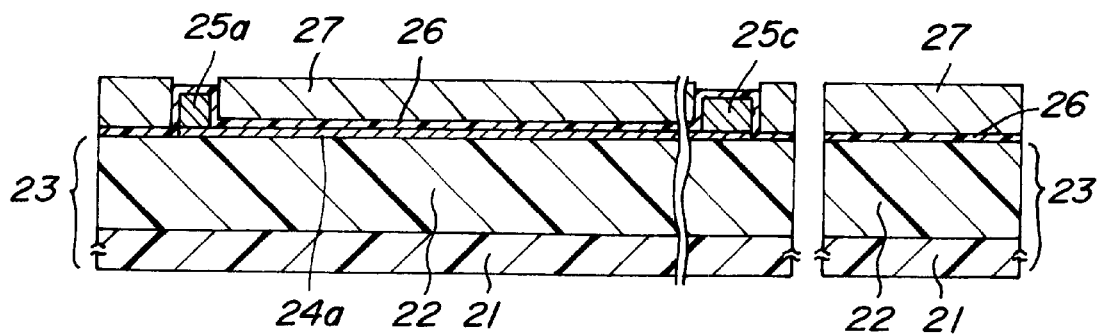
FIG_13A    FIG_13B
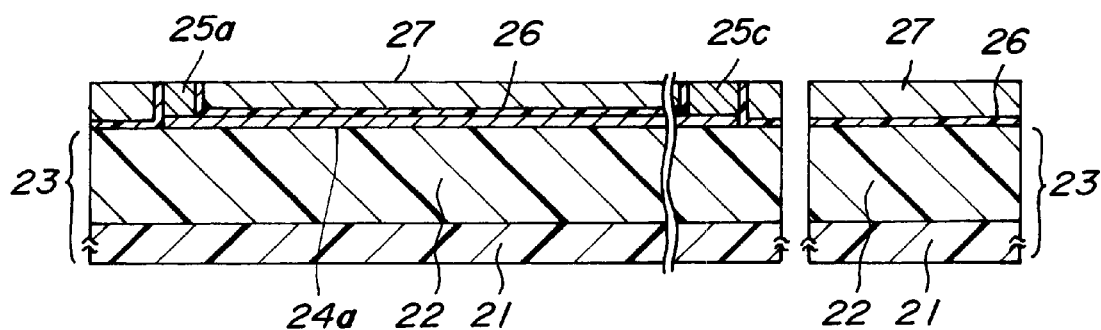
FIG_14A    FIG_14B

FIG_15A
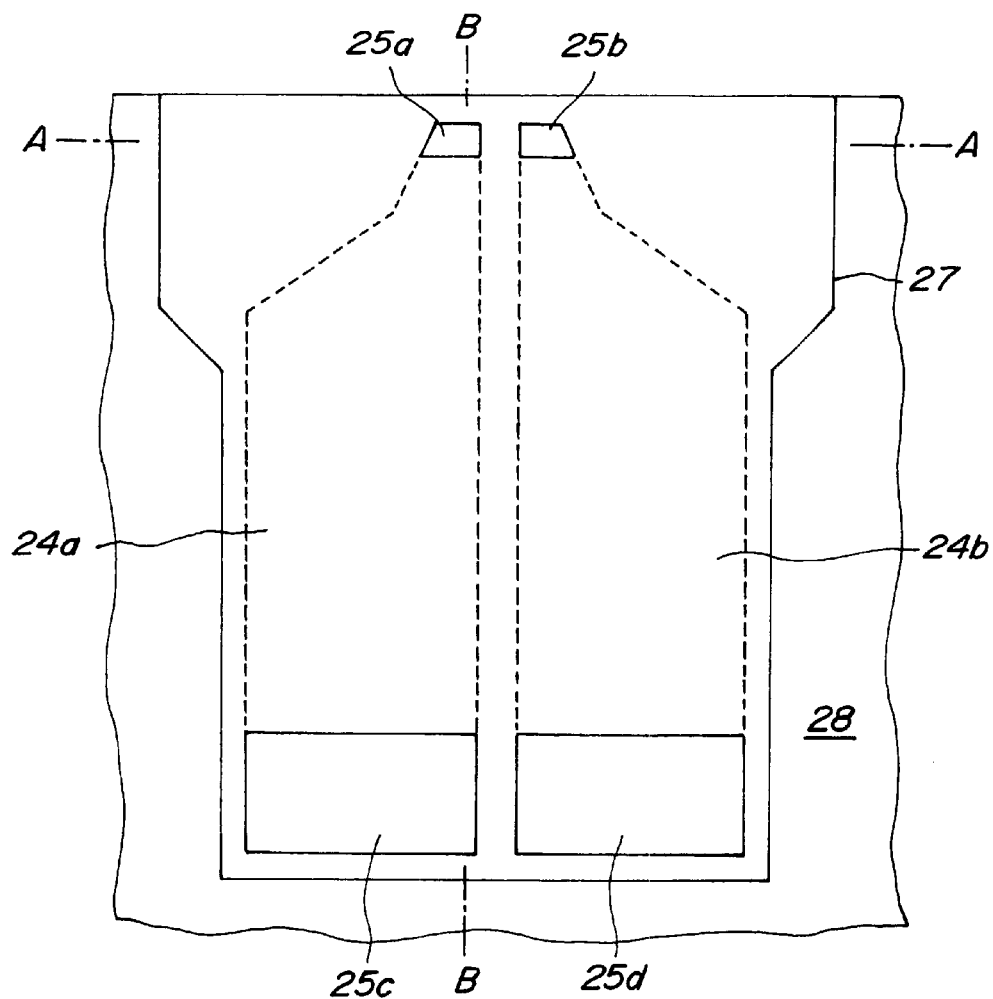
FIG_15B
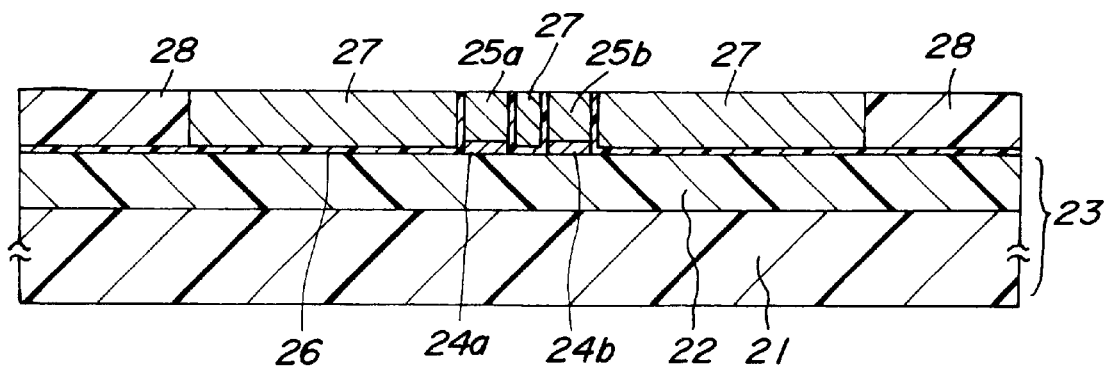

FIG_16A  FIG_16B
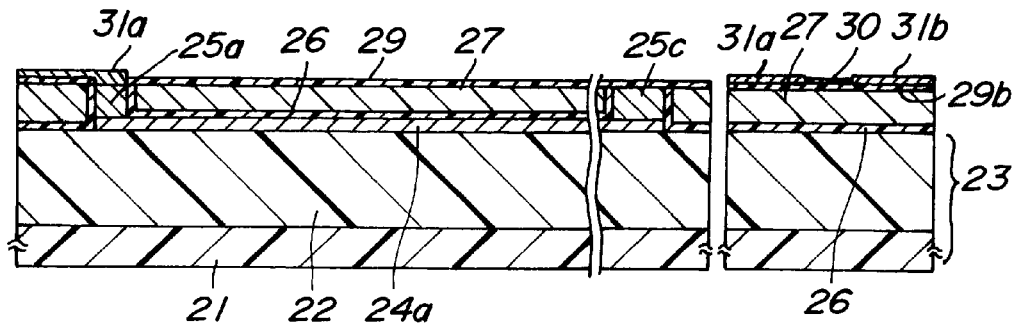
FIG_17
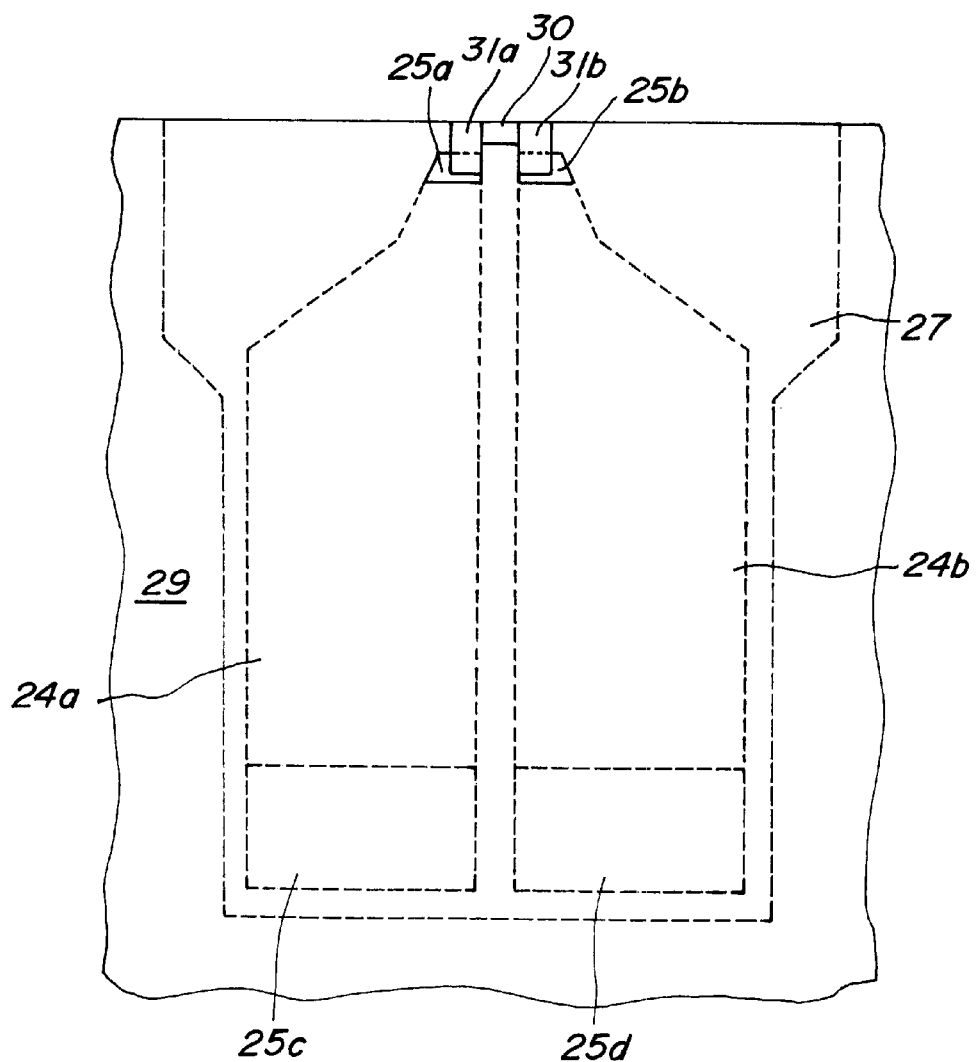

FIG_18A  FIG_18B
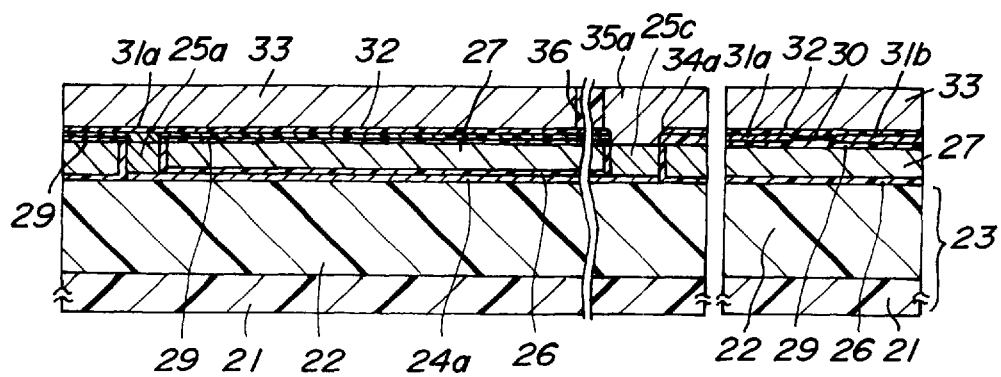
FIG_19
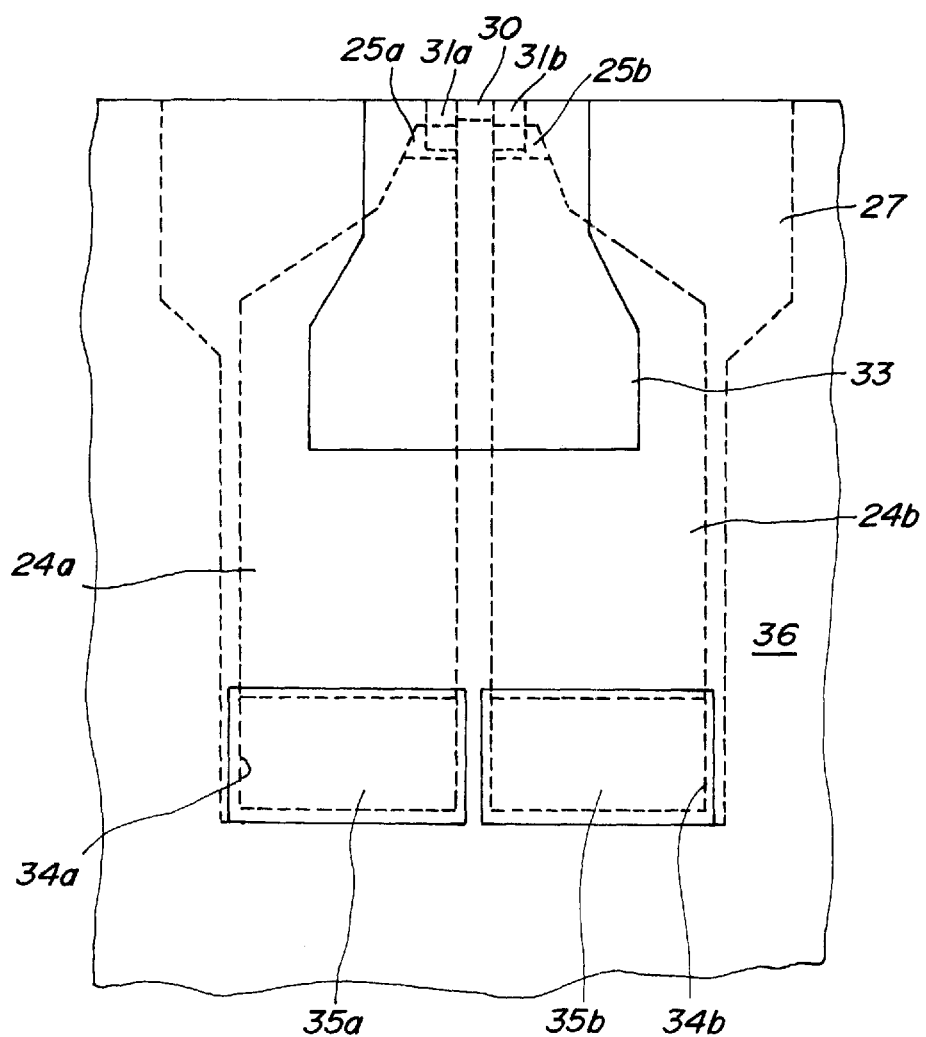

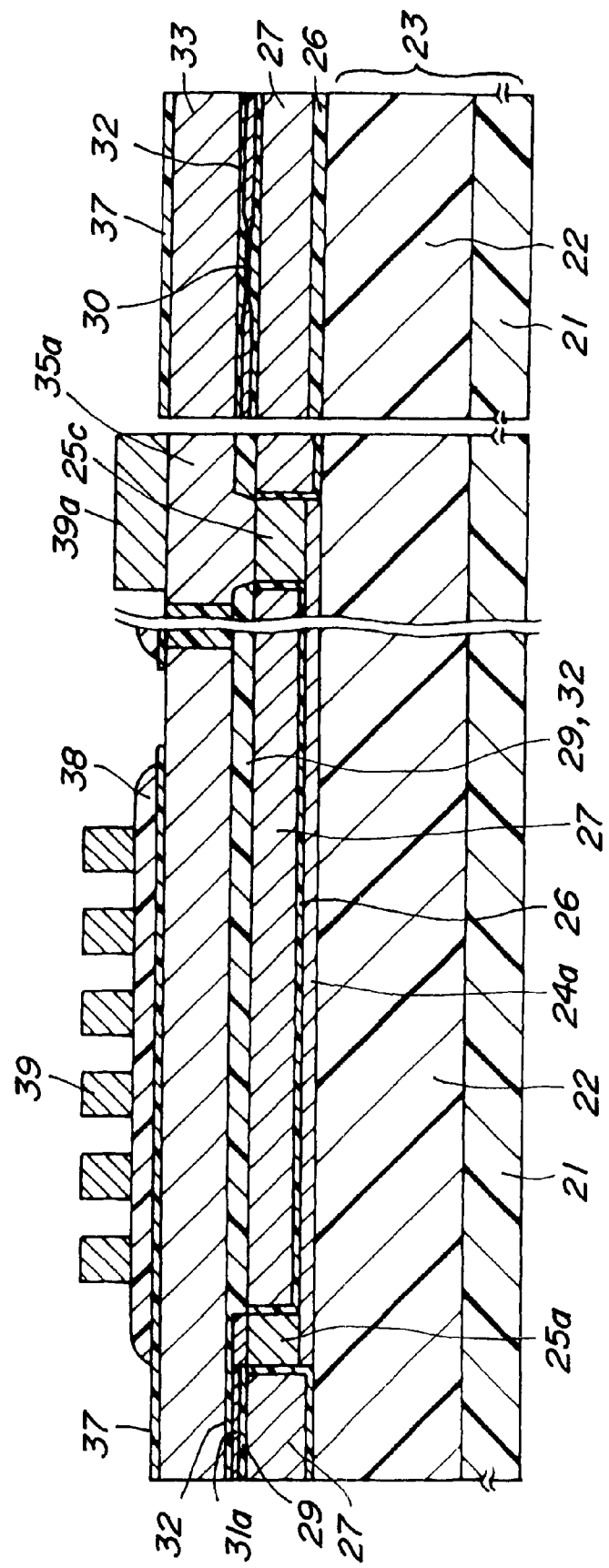

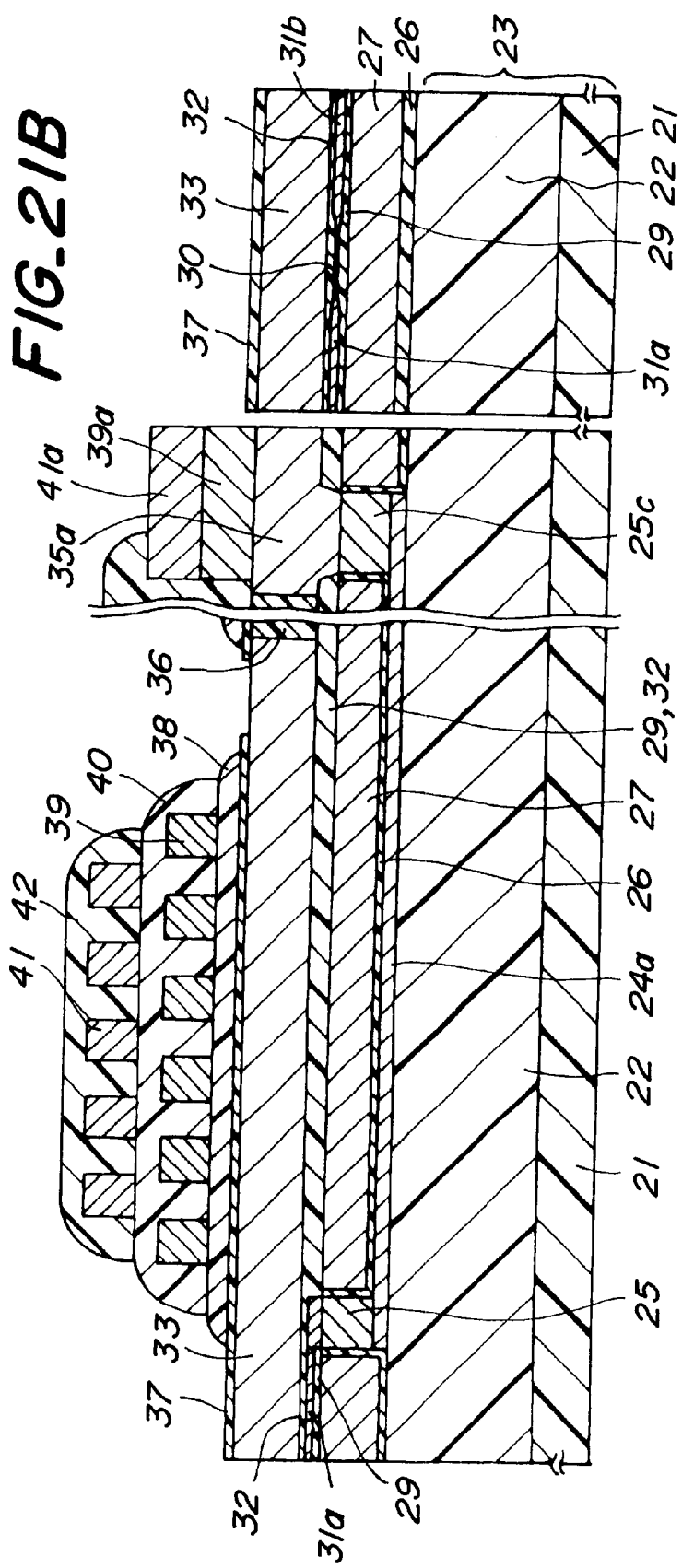

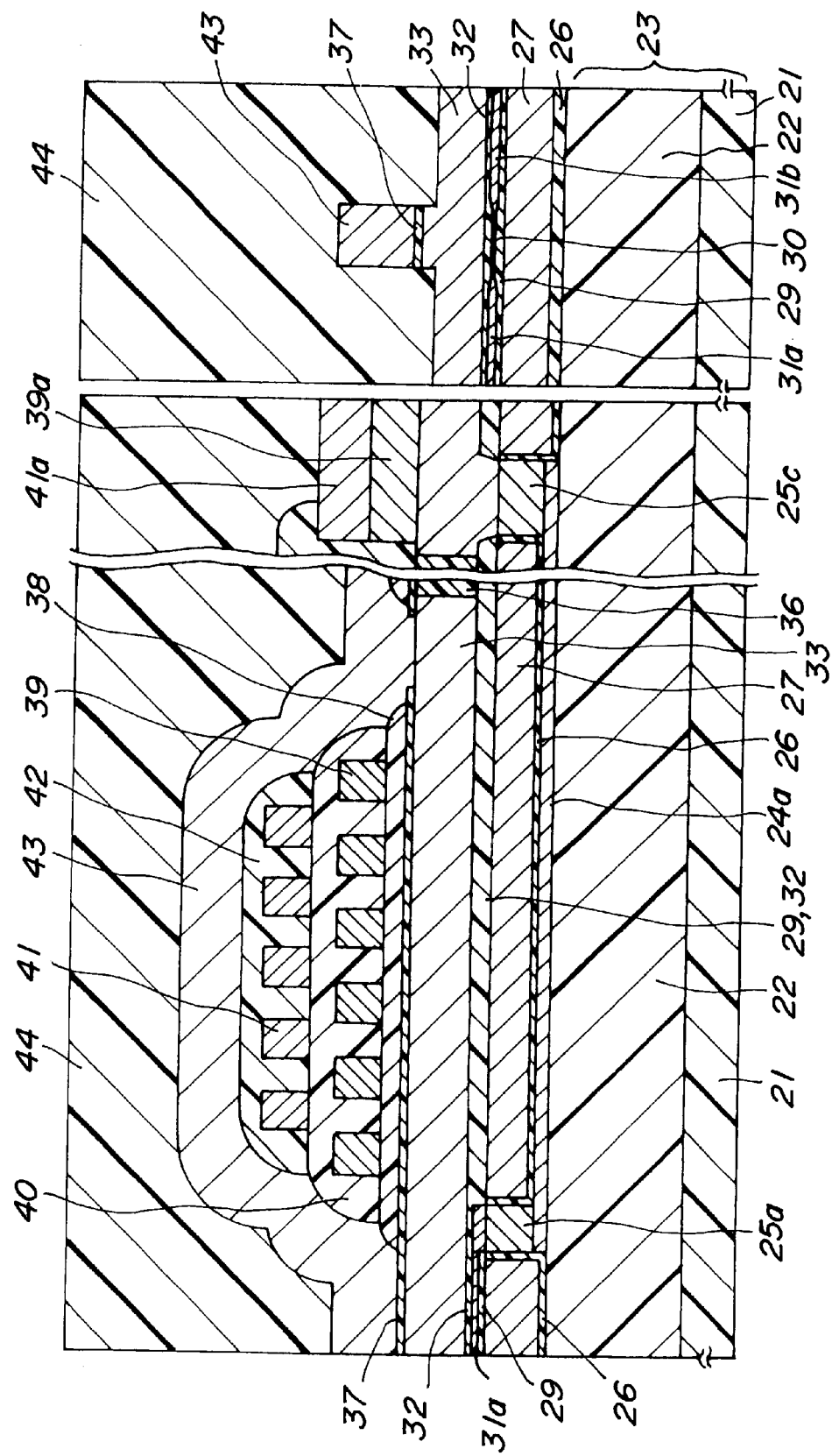

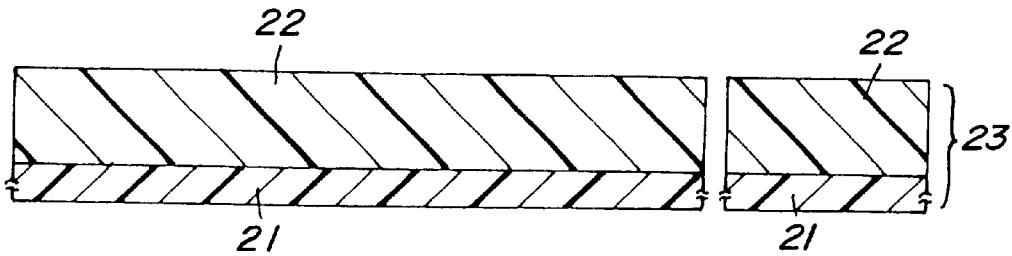
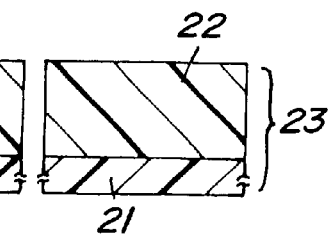
FIG._24A  FIG._24B
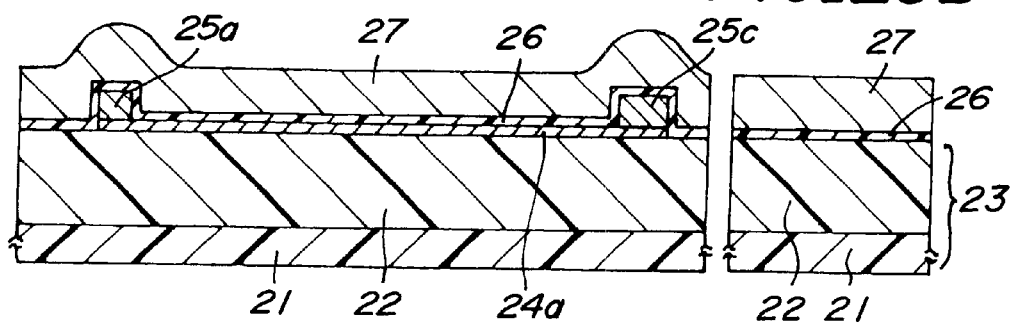
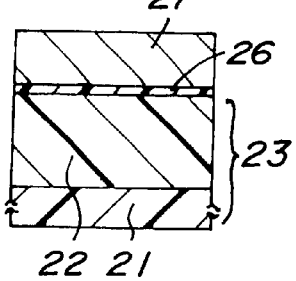
FIG._25A  FIG._25B
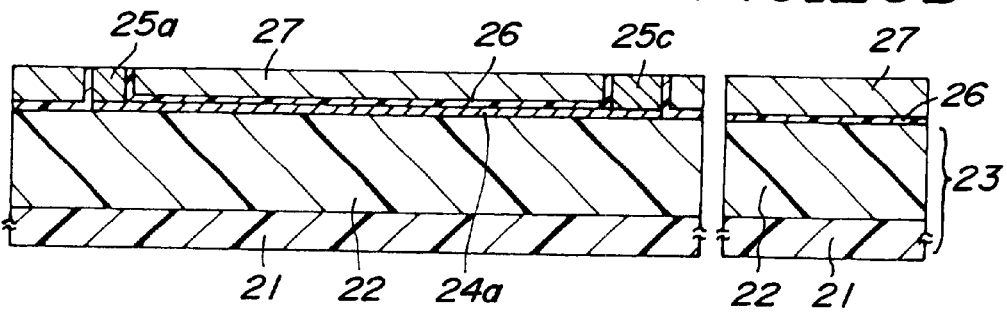
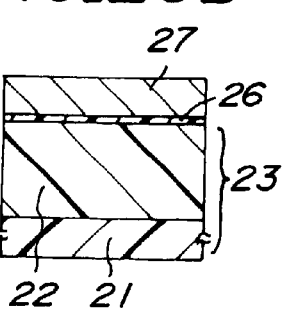
FIG._26A  FIG._26B
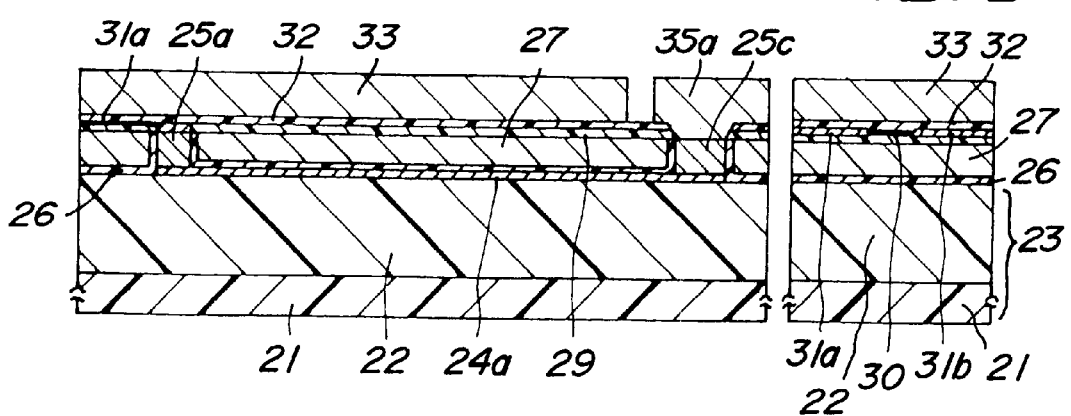
FIG._27A  FIG._27B

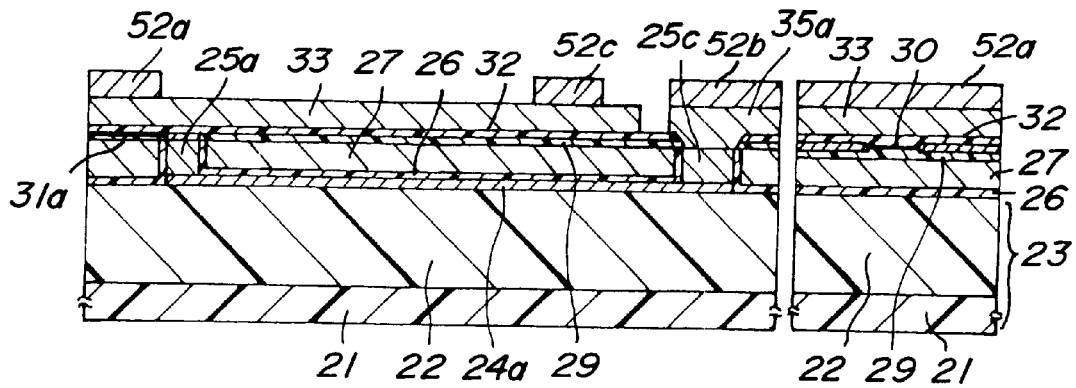
FIG._28A  FIG._28B
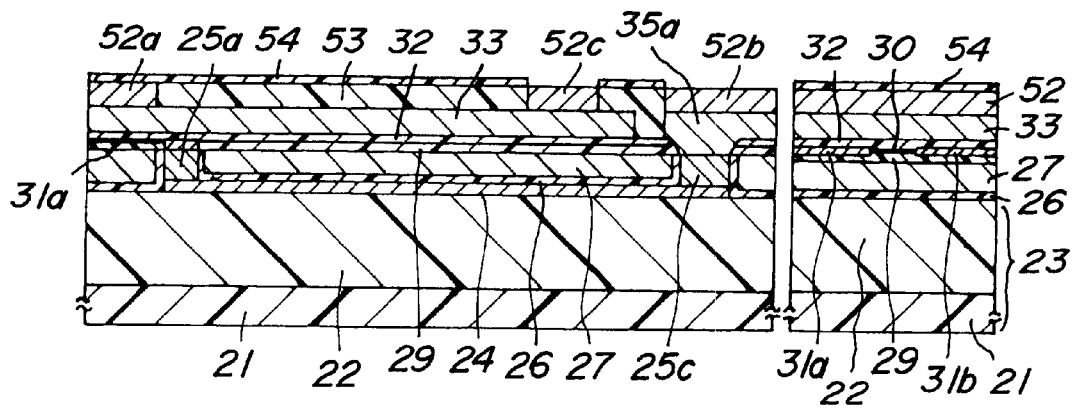
FIG._29A  FIG._29B
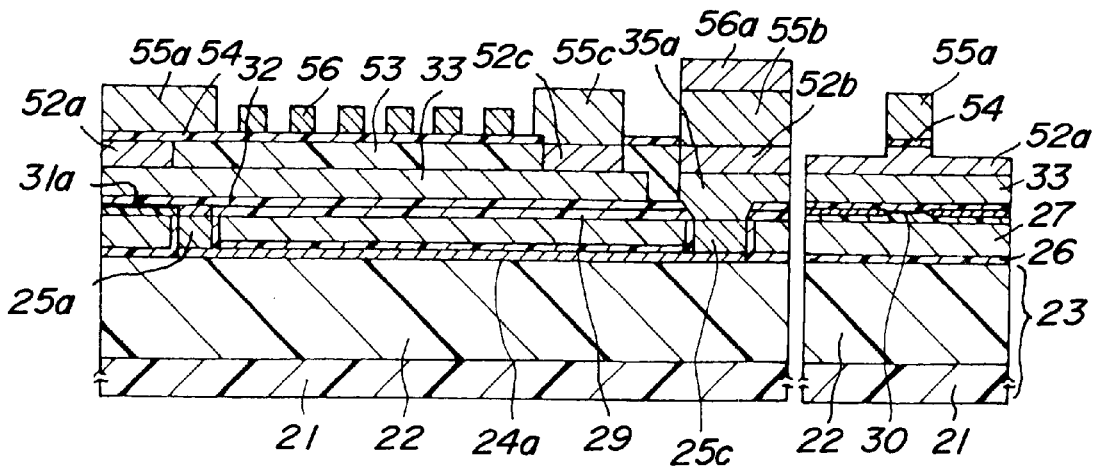
FIG._30A  FIG._30B

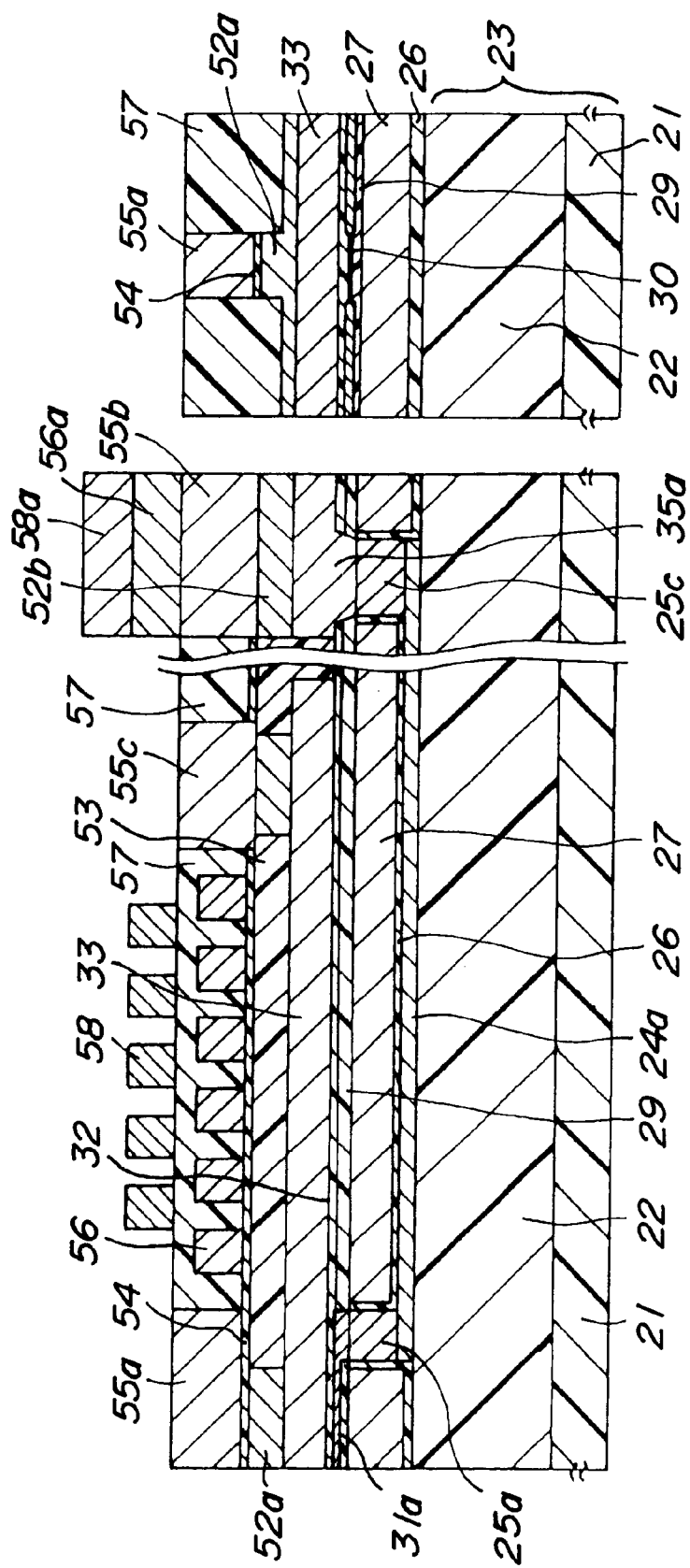

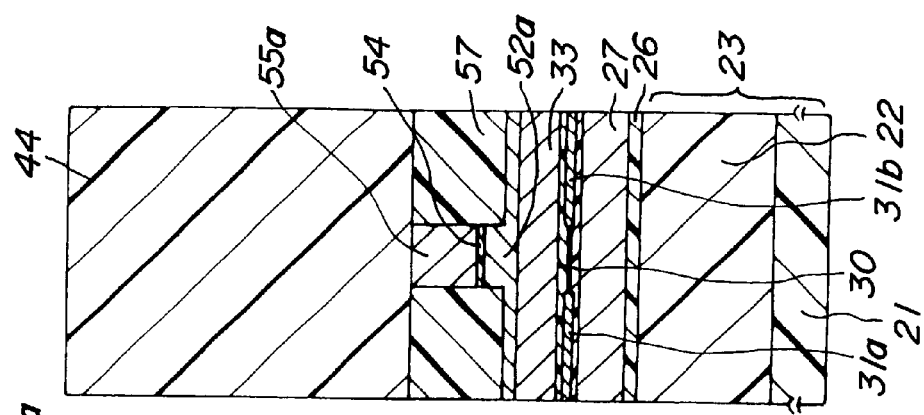
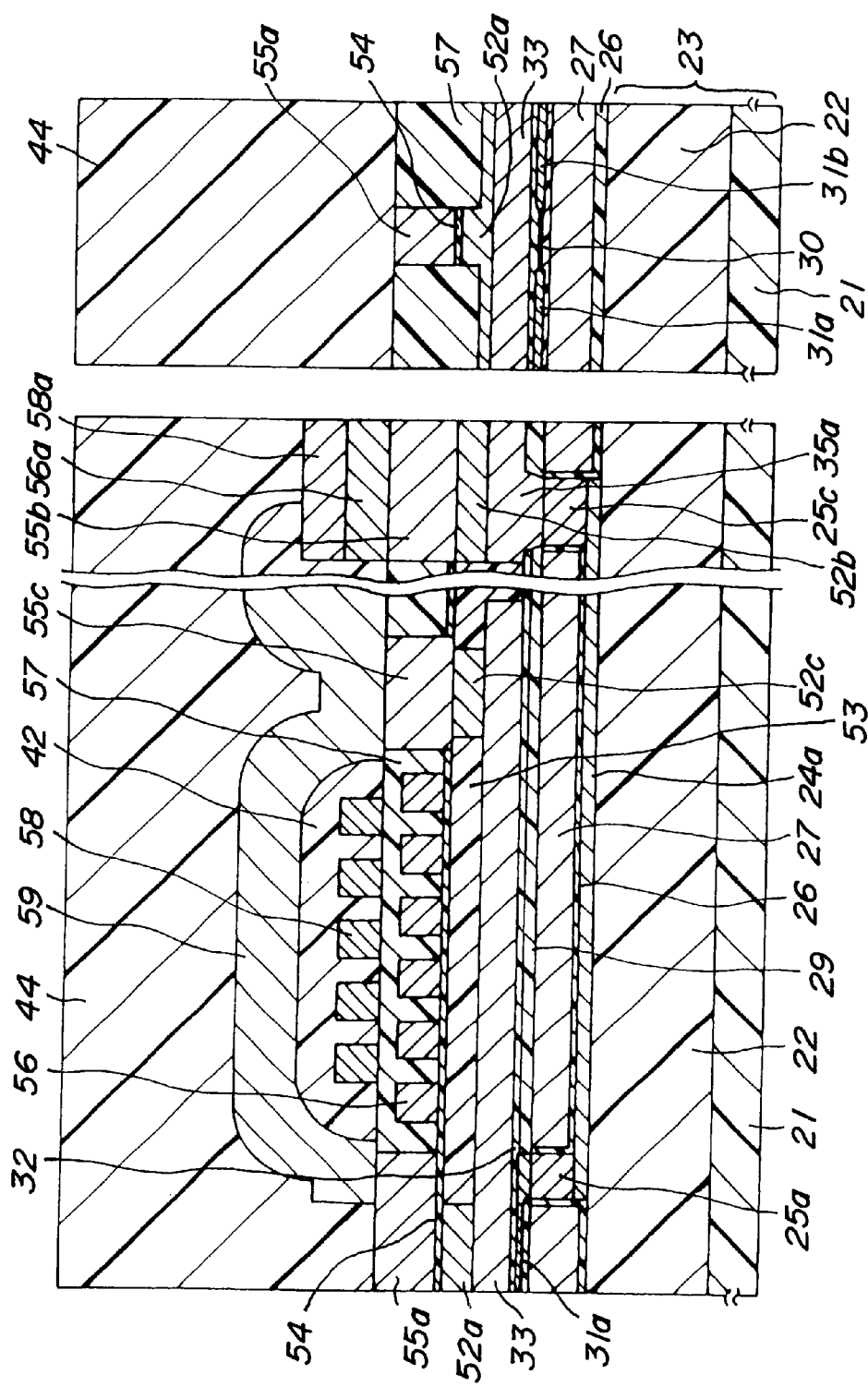
FIG. 32A
FIG. 32B

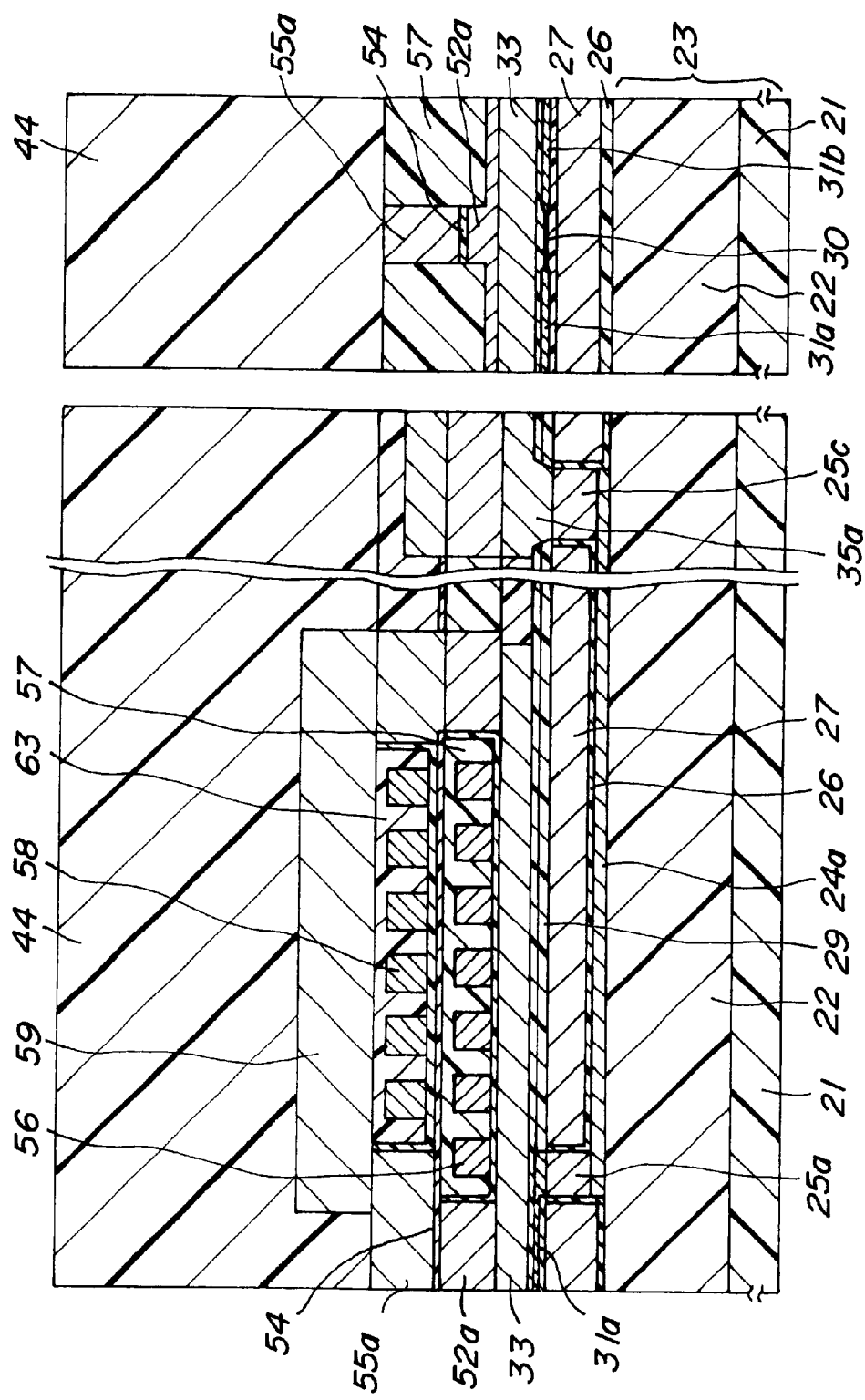

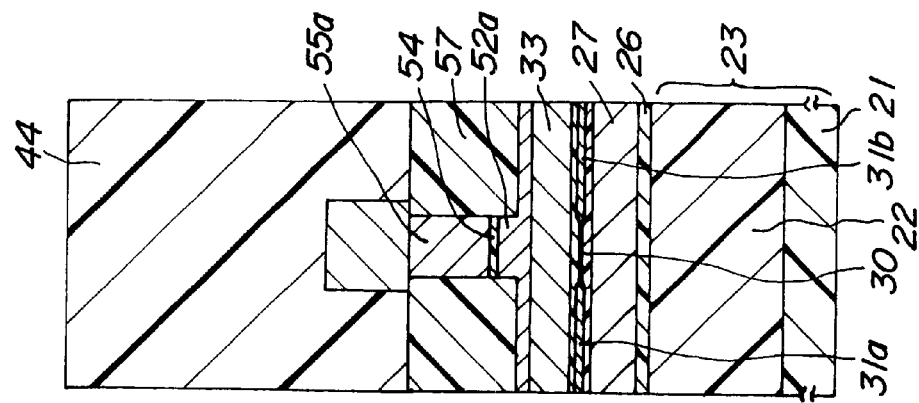
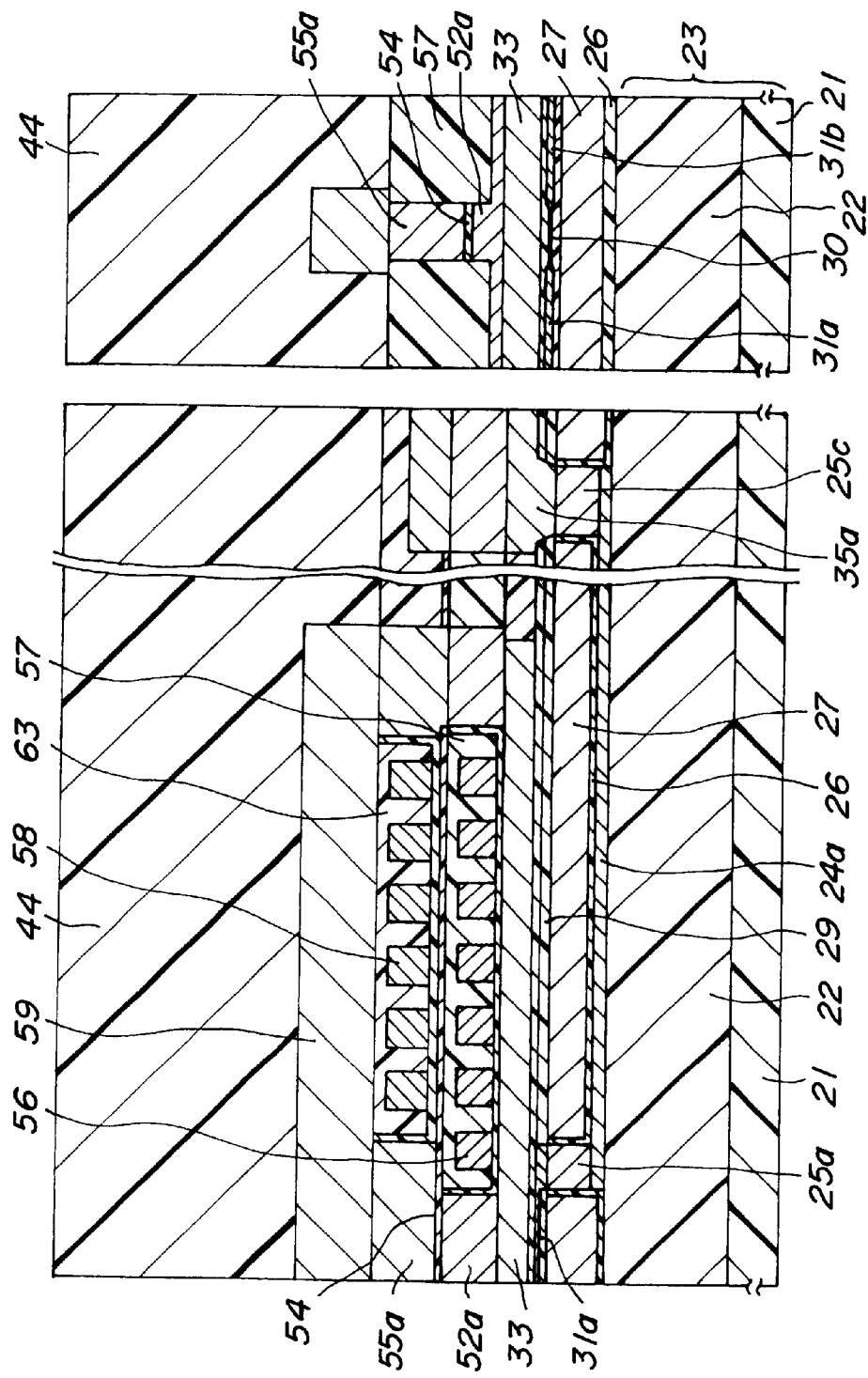

SYSTEM AND METHOD FOR MANUFACTURING A COMPOSITE TYPE THIN FILM MAGNETIC HEAD HAVING A READING MAGNETORESISTIVE EFFECTIVE TYPE THIN FILM MAGNETIC HEAD AND A WRITING INDUCTIVE TYPE THIN FILM MAGNETIC HEAD THAT ARE STACKED

BACKGROUND OF THE INVENTION

1. Field of the Invention

This invention relates to a thin film magnetic head having at least a reading magnetoresistive effective type thin film magnetic head and a method of manufacturing the same, particular a composite type thin film magnetic head in which a reading magnetoresistive effective type thin film magnetic head and a writing inductive type thin film magnetic head are stacked and supported by a substrate and a method of manufacturing the same.

2. Related Art Statement

Recently, with the development of surface recording density in hard disk devices, composite type thin film magnetic heads are required to have excellent characteristics.

Then, a composite type thin film magnetic head in which an inductive type thin film magnetic head for writing and a magnetoresistive effective type thin film magnetic head for reading is suggested and practically used. Although as the reading magnetoresistive element, a magnetoresistive effective type thin film magnetic head using a normal anisotropic magnetoresistive (AMR) effect has been generally employed, magnetoresistive effective type thin film magnetic heads using a giant magnetoresistive (GMR) effect able to obtain larger resistance variation ratio than the AMR element and three to five times as large output as the AMR element and a tunneling junction magnetoresistive (TMR) effect are developed.

In this specification, these AMR element, GMR element and TMR element are generically called as a "magnetoresistive effective type thin film magnetic head" or a "MR reproducing element" in brief.

The use of the AMR element enables a surface recording density of several giga bits/inch$^2$ to be realized, and the use of the GMR element or the TMR element enables the surface recording density to be more enhanced. Such a high surface recording density can realize a hard disk having a large capacity of more than 10G bites.

Generally, a MR film is composed of a film made of magnetic material showing the magenetoresistive effect and has a single layered structure. On the contrary, the GMR film mainly has a multi-layered structure composed of some films. There are some kinds of mechanism to generate the GMR effect, and the GMR film has a different structure depending on the mechanism. Concretely, as the GMR film, a superlattice GMR film, a granular film and a spin-valve film are exemplified. Particular, the spin-valve film has a relatively simple structure, suitable for mass-production, and shows a large resistance variation by a weak magnetic field.

In this way, the reading magnetoresistive effective type thin film magnetic head capable of attaining a high surface recording density can be easily realized by using the GMR film instead of the AMR film. On the other hand, with the characteristics of the reproducing head being enhanced, the characteristics of the writing head is required to be developed. The development of the surface recording density requires an enhancement of a track density in a magnetic recording medium. Thus, a width of a write gap in an ABS has to be narrowed to a submicron order from a several micron order, and for realizing it, a semiconductor processing technique is employed.

FIGS. 1–8 shows successive manufacturing steps of a conventional normal composite type thin film magnetic head. In each figures, reference "A" depicts a cross sectional view of the thin film magnetic head perpendicular to an ABS, and reference "B" depicts a cross sectional view of the magnetic pole portion parallel to the ABS. The composite type thin film magnetic head in this embodiment has a reading GMR reproducing element on a substrate and a writing inductive type thin film magnetic head stacked on the reading element. Since in practically manufacturing a thin film magnetic head, many thin film magnetic heads are formed on a wafer at the same time, the end of each thin film magnetic head does not appear. However, in the above figures, the end of the thin film magnetic head is shown for clarifying the figures.

First of all, as shown in FIG. 1, an insulating layer 2 made of alumina ($Al_2O_3$) is formed in a thickness of about 5–10 μm on a substrate 1 made of AlTiC, for example, on which a first magnetic layer 3 constituting one magnetic shield layer to protect the reading GMR element from an external magnetic field is formed in a thickness of 2–3 μm.

Then, as shown in FIG. 2, a first shield gap layer 4 is sputterformed, of alumina, in a thickness of about 50–100 μm, and thereafter a multilayered structure-magnetoresistive layer 5 constituting the GMR reproducing element is formed in a thickness of less than 10 μm. Moreover, for forming the magnetoresistive layer 5 into a desired pattern, a photoresist layer 6 is formed on the layer 5. In this case, the photoresist layer 5 is formed to a shape for itself to be easily lifted off, for example, T-shape. Next, the magnetoresistive layer 5 is ion-milled through the photoresist film 6 as a mask, and thereby is formed in a desired pattern.

Then, as shown in FIG. 3, a first and a second conductive layers 7a, 7b are formed in a thickness of several ten nm by using the photoresist film 6 as a mask. The conductive layers 7a, 7b are composed of TiW/CoPt/TiW/Ta laminated body. Next, as shown in FIGS. 4 and 5, the photoresist film 6 is removed by a lift-off process. As shown in FIGS. 4B and 5, the one ends of the first and second conductive layers 7a, 7b are connected to the one ends of the magnetoresistive layer 5, respectively. Moreover, as shown in FIG. 5, the cross section in FIG. 4A is taken on the plane slightly approaching to the first conductive layer 7a, not the plane passing through the center of the magnetoresistive layer 5 and perpendicular to the ABS.

Subsequently, as shown in FIG. 6, renewedly, a second shield gap film 8 made of alumina is formed in a thickness of 50–150 nm to embed the magnetoresistive layer 5 into the first and second shield gap layers 4, 8, and a second magnetic layer 9 made of permalloy is formed in a thickness of 2–3 μm. The second magnetic layer 9 work not only as the other shield to magnetically shield the GMR reproducing element with the above first magnetic layer 3, but also as one pole in the writing thin film magnetic head.

Then, as shown in FIG. 7, a write gap layer 10 made of nonmagnetic material, for example, alumina, is formed in a thickness of about 200–300 nm on the second magnetic layer 9 and thereafter an insulating layer 11 made of photoresist is formed, on the part for a thin coil to be formed, in a thickness of 1–2 μm corresponding to a given pattern, on which a first layer-thin film coil 12 is formed in a thickness of 3 μm, insulation-separated by the photoresist film 13. Moreover, the insulating layer 13 made of photoresist to cover the first layer-thin film coil 12 is flattened by thermal treatment, and thereafter a second layer-thin film coil 14 is formed in a thickness of 3 μm so as to be insulation-separated and supported by an insulating layer 15 made of photoresist.

Then, the insulating layer 15 made of photoresist to cover the second layer-thin film coil 14 is flattened by thermal treatment, and thereafter as shown in FIG. 8, a third magnetic layer 16 is formed corresponding to a given pattern. Then, as shown in FIG. 9, an overcoat layer 17 is formed in a thickness of 20–30 μm. The third magnetic layer 16 is made of a permalloy material or FeN material having a high saturated magnetic flux density.

Lastly, the side surfaces of the magnetoresistive layer 5 and the write gap layer 10 are polished to form an air bearing surface (ABS) 18 opposing to a magnetic recording medium. A GMR reproducing element 19 is obtained through the polishing of the magnetoresistive layer 5 during the manufacturing process of the ABS 18.

In this way, the composite type thin film magnetic head in which the magnetoresistive effective type thin film magnetic head and the inductive type thin film magnetic head are stacked can be obtained. In the magnetic head, the MR height MRH of the GMR reproducing element is defined as the distance between the ABS 18 and the edge of the magnetoresistive layer 5 opposite to the ABS, and the throat height TH of the inductive type thin film magnetic head is defined as the distance between the ABS 18 and the side edge in the ABS side of the insulating layer 11. In a practical thin film magnetic head, pads to connect the first and second conductive layers 7a, 7b connected to the thin film coils 12, 14 and the GMR reproducing element 19 electrically to outside are formed on the side of the substrate, but in the above figures, the pads are omitted.

Since in the above conventional composite type thin film magnetic head, the first and second conductive layers 7a, 7b connected to the magneto-resistive layer 5 is opposed to the first magnetic layer 3 constituting a bottom shield and the second magnetic layer 9 constituting a top shield via the remarkably thin shield gap film, the electrical insulation between the these conductive layers and these magnetic layers is unlikely to be maintained in a good condition. The low insulation of the shield gap layers 4, 8 can not give the conventional composite type thin film magnetic head a high process yield.

For enhancing the insulation of the shield gap layers 4 and 8, it is considered to increase their thicknesses. However, from the view of a thermal asperity brought about with the development of the characteristics of the magnetoresistive effective type thin film magnetic head, the thickness of the shield gap layer is required to be as small as possible. As a result, the insulation of the shield gap layer can not be developed by increasing its thickness.

That is, in the magnetoresistive effective type thin film magnetic head, for overcoming the thermal asperity of degrading its reproducing characteristic due to its self-heat generation in reproducing, it is required that the first magnetic layer 3 constituting the bottom shield is made of a magnetic material having an excellent cooling efficiency such as permalloy or sendust, and the first and second shield gap layers 4 and 8 are formed, of alumina, in an extremely thin thickness of 50–100 nm by sputtering, so that the shield gap layer can not have a thicker thickness.

Moreover, in the magnetoresistive effective type reproducing element like the GMR reproducing element 19, for increasing its output, the resistances of the first and second conductive layers 7a, 7b are reduced, which has an advantage of ironing out the thermal asperity as above-mentioned. For decreasing the resistances of the first and second conductive layers 7a and 7b, it is considered to increase their thicknesses. However, the magneto-resistive effective type reproducing element has to be miniaturized for obtaining a high surface recording density and realizing a high efficiency, and from its view, it is restricted to increase the thickness of the conductive layer.

For mitigating the thermal asperity, improving the insulation defect between the conductive layer 7a, 7b in the GMR reproducing element 19 and the first and second magnetic layers 3, 9, and reducing the resistances of the conductive layers, the FIG. 3 in U.S. Pat. No. 5,907,459 discloses that a conductive layer constituting a lead for a magnetoresistive element is formed in a thinner thickness in a magnetic pole portion nearby an ABS and in a thicker thickness in the area except the magnetic pole portion.

However, when the conductive layer is formed in a stepped structure, a second shield gap layer is not formed precisely on the conductive layer, so that good insulation for a top shield can not be obtained.

Moreover, for ironing out the above problems, the Patent Gazette suggests the structure in which a bottom shield is provided only nearby the ABS, and a thick conductive layer is formed in the backward of the ABS, its surface being flattened, and is connected to a magnetoresistive element via a thin conductive layer formed on the flattened surface. Since such a structure enables the surface of the conductive layer to be almost flattened without having the step as above-mentioned, even if the thickness of the top shield gap layer is made thinner, the insulation between the conductive layer and the top shield is not deteriorated. Besides, since the better part of the conductive layer can be formed thick, their resistance can be reduced.

However, the composite type thin film magnetic head disclosed in the U.S. Pat. No. 5,907,459 has the bottom shield only nearby the ABS, so that, can not have sufficient good magnetic shield effect. For reading output signals from a minute magnetoresistive element, the noise due to the external magnetic field generated from an inductive coil or a hard disk motor, etc. has to be reduced as small as possible, but in the case of forming the bottom shield only nearby the ABS, the noises can not be suppressed sufficiently and the reproducing signals can not be read precisely.

Furthermore, since a magnetoresistive film and the thick conductive layer are electrically connected each other via a thin, thus a large resistive conductive layer, the heat generation in the thin conductive layer is maintained unmitigated. Since the thin conductive layer is adjacent to the magnetoresistive film, the heat generation brings about large influences for the thin film magnetic head.

SUMMARY OF THE INVENTION

It is an object of the present invention to provide a composite type thin film magnetic head to iron out or mitigate the various problems in the above conventional composite type thin film magnetic head and to remove the thermal asperity by decreasing the thickness of the shield gap layer, besides, to enhance the insulation between the conductive layer and the shield in the magnetoresistive element and the reproducing characteristics by reducing the resistance of the conductive layer.

It is another object of the present invention to provide a method capable of manufacturing in a high process yield such a composite type thin film magnetic head having the above excellent characteristics effectively.

An exemplary thin film magnetic head according to the present invention can include a substrate made of an insulating material, a first magnetic member, supported by the substrate, constituting one shield in a magnetoresistive effective type thin film magnetic head, and a magnetoresistive layer formed so as to be embedded in a shield gap layer on the opposite surface of the first magnetic member to the surface thereof supported by the substrate. The exemplary magnetic head can also include a second magnetic member constituting the other shield of the magnetoresistive effective type thin film magnetic head on the opposite surface of the shield gap layer to the first magnetic member, and an electrical connecting member to connect the magnetoresistive layer to an external circuit, having a first and a second conductive layer extending in insulating separation between the substrate and the first magnetic member.

An exemplary composite type thin film magnetic head in which a reading magnetoresistive effective thin magnetic head and a writing inductive type thin film magnetic head are stacked can include a substrate made of an electrical insulating material, a first magnetic member constituting one shield in a magnetoresistive effective type thin film magnetic head, supported by the substrate, and a magnetoresistive layer formed so as to be embedded in a shield gap layer on the opposite surface of the first magnetic member to the surface supported by the substrate. The magnetic head can further include a second magnetic member constituting the other shield of the mangetoresistive effective type thin film magnetic head and one pole of the inductive type thin film magnetic head, formed on the opposite surface of the shield gap layer to the first magnetic member, a write gap film formed at least on the opposite surface to the shield gap layer of the magnetic pole portion in the second magnetic member, and a third magnetic member constituting the other pole of the inductive type thin film magnetic head, opposing to the second magnetic member via the write gap film in a magnetic pole portion including an air bearing surface, magnetically connected to the second magnetic member in a position apart from the air fearing surface. Additionally, the magnetic head may include a thin film coil, its part being arranged in insulating separation with an insulating material so as to pass through the closed magnetic circuit composed of the second and the third magnetic member, and an electrical connecting member for the mangetoresistive layer, having a first and a second conductive layers extending in insulating separation between the substrate and the first magnetic member.

In such a thin film magnetic head according to the present invention, since the first and second conductive layers constituting the better part of the electric connecting member to connect the magnetoresistive layer to the external circuit are positioned between the substrate and the first magnetic member constituting a bottom shield, the conductive layers are formed sufficiently thick to reduce their resistances. Besides, since the first magnetic member as well as the shield gap layer is intervened between these conductive layers and the second magnetic member constituting a top shield, the dielectric breakdown therebetween does not occur at all.

In the composite type thin film magnetic head according to the present invention, it is preferable to connect the ends of the pair of conductive layers in the magnetoresistive layer-side to the magnetoresistive layer via conductive plugs extending throughout the first magnetic layer member. Since the conductive plugs may be positioned near the both ends of the magnetoresistive layer, the resistance of the electrical connecting member for the magnetoresistive layer can be more reduced.

Moreover, the conductive layers and the conductive plugs are preferably made of a Cu material having a small resistance to be easily formed and processed. In addition, the conducive layer made of the Cu material preferably has a thickness of 0.5–1 $\mu$m, and the conductive plug made of the Cu material, as well preferably 2–3 $\mu$m, depending on the thickness of the first magnetic layer.

An exemplary manufacturing method of a composite type thin film magnetic head in which a reading magnetoresistive effective type thin film magnetic head and a writing inductive type thin film magnetic head are stacked on a substrate, can include the steps of forming a first and a second conductive layers constituting leads to electrically connected to a magnetoresistive element in the magnetoresistive effective type thin film magnetic head, corresponding to a give pattern, forming a first magnetic member constituting a bottom magnetic shield on the first and second conductive layers and on the part for the magnetoresistive element to be formed later, insulated from the first and second conductive layers. The method can further include forming the magnetoresistive element on the surface of the first magnetic member so that it may be embedded in a shield gap layer and its both ends may be electrically connected to the first and the second conductive layers, respectively, and forming, on the shield gap layer, a second magnetic member doubling as a top magnetic shield and the bottom yoke of the inductive type thin film magnetic head and a third magnetic member constituting a write gap layer, a thin film coil and a top yoke, and thereby the inductive type thin film magnetic head.

In an embodiment of the manufacturing method of the composite type thin film magnetic head according to the present invention, a first and a second conductive plugs are formed throughout the first magnetic member in the ends of the first and the second conductive layers to be electrically connected to the magnetoresistive element. Then, after the magnetoresistive element is formed, a first and a second drawing electrode layers to connect its both ends to the first and the second conductive plugs, respectively, are formed. Moreover, a third and a fourth conductive plugs are formed at the ends of the first and the second conductive layers in the opposite side to the ends to be electrically connected to the magnetoresistive element. Then, it is preferable that in forming the second magnetic member, openings are formed at the shield gap layer and through the openings, the first and the second conductive layers made of the same material as the second magnetic member are formed so as to be connected to the third and the fourth conductive plugs.

In another embodiment of the manufacturing method of the composite type thin film magnetic head according to the present invention, the step of forming the first magnetic member comprises the step of forming a first magnetic layer on an insulating layer to cover the surfaces of the first and second conductive layers and the substrate, and the step of forming the second magnetic member comprises the step of forming a second magnetic layer on the surface of the shield gap layer. Then, the step of forming the third magnetic member comprises the step of forming, on the surface of the write gap layer, a third magnetic layer having a magnetic pole portion opposing to the second magnetic layer via the write gap layer and to be magnetically connected to the second magnetic layer in the opposite side to an ABS.

In a further embodiment of the manufacturing method of the composite type thin film magnetic head according to the present invention, the step of forming the first magnetic member comprises the step of forming a first magnetic layer on an insulating layer to cover the surfaces of the first and second conductive layers and the substrate, and the step of forming the second magnetic member comprises the steps of forming a second magnetic layer on the surface of the shield gap layer and forming a first pole chip on the surface of the second magnetic layer. Then, the step of forming the third magnetic member comprises the steps of forming a second pole chip so as to oppose to the first pole chip via the write gap layer and forming a third magnetic layer magnetically connected to the second pole chip and magnetically connected to the second magnetic layer in the opposite side to the ABS.

In each of the above embodiments, the third magnetic layer may be formed so that its forefront may be exposed to or receded from the ABS.

In an embodiment of the manufacturing method of the composite type thin film magnetic head, the step of forming the thin film coil comprises the steps of forming a first layer-thin film coil within the thickness of the second pole chip, flattening the surfaces of the first layer-thin film coil and the second pole chip and forming a second layer-thin film coil on the flattened surfaces.

In another embodiment of the manufacturing method of the composite type thin film magnetic head according to the present invention, the step of forming the thin film coil comprises the steps of forming a first layer-thin film coil within the thickness of the first pole chip, flattening the surfaces of the first layer-thin film coil and the first pole chip, forming a second layer-thin film coil on the flattened surfaces so as to be accommodated within the thickness of the second pole chip and flattening the surfaces of the second layer-thin film coil and the second pole chip. In this case, the third magnetic layer is preferably formed on the flattened surfaces of the second pole chip and the second layer-thin film coil.

BRIEF DESCRIPTION OF THE DRAWINGS

For a better understanding of this invention, reference is made to the attached drawings, wherein:

FIGS. 1A–8B are cross sectional views showing the successive steps in manufacturing a conventional composite type thin film magnetic head, FIGS. 9A–9B are plan views showing the state after the lead for the magnetoresistive element is formed in the conventional composite type thin film magnetic head, FIGS. 10A–10B are cross sectional views showing a first step in a first embodiment in the manufacturing method of the composite type thin film magnetic head according to the present invention, FIGS. 11A and 11B are cross sectional views showing the next step, FIGS. 12A and 12B are a plan view and a cross sectional view in the step of FIG. 11, FIGS. 13A and 13B are cross sectional views showing the next step, FIGS. 14A and 14B are cross sectional views showing the next step, FIGS. 15A and 15B are a plan view and a cross sectional view in the step of FIG. 14, FIGS. 16A and 16B are cross sectional views showing the next step, FIG. 17 is a plan view in the step of FIG. 16, FIGS. 18A and 18B are cross sectional views showing the next step, FIG. 19 is a plan view in the step of FIG. 18, FIGS. 20A and 20B are cross sectional views showing the next step, FIGS. 21A and 21B are cross sectional views showing the next step, FIGS. 24A–32B are cross sectional views showing the successive steps in manufacturing a second embodiment-thin film magnetic head according to the present invention, FIGS. 33A and 33B are cross sectional views showing a third embodiment-structure of the thin film magnetic head according to the present invention, FIGS. 34A and 34B are cross sectional views showing a fourth embodiment-structure of the thin film magnetic head according to the present invention.

DETAILED DESCRIPTION OF PREFERRED EMBODIMENTS

Figure 5:
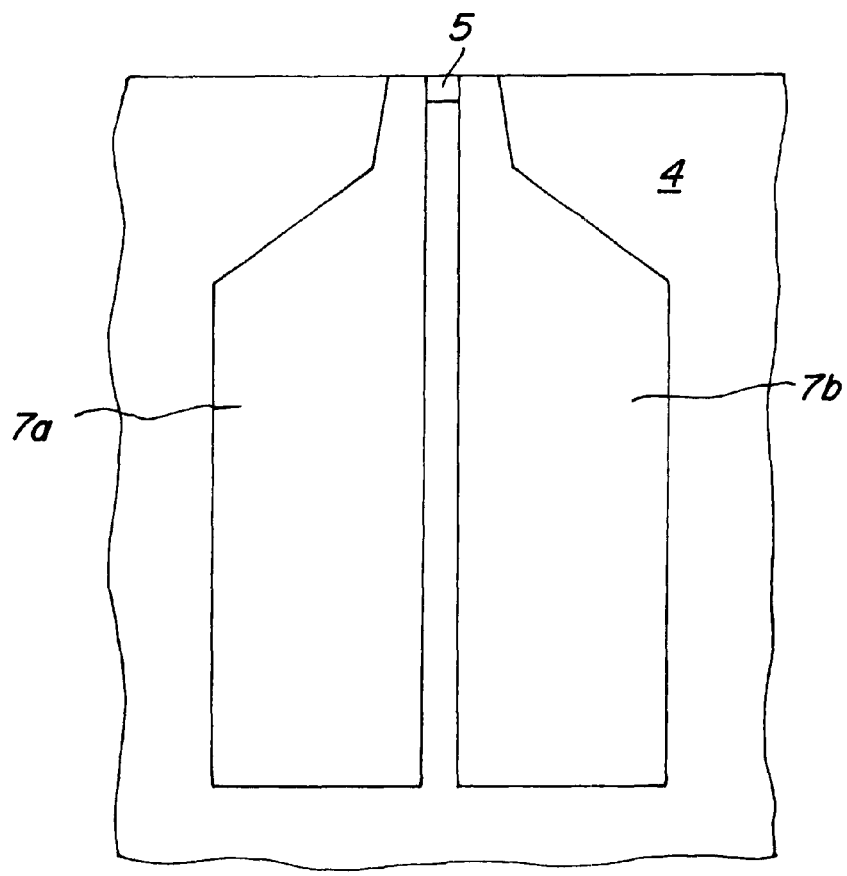
Figure 6A:
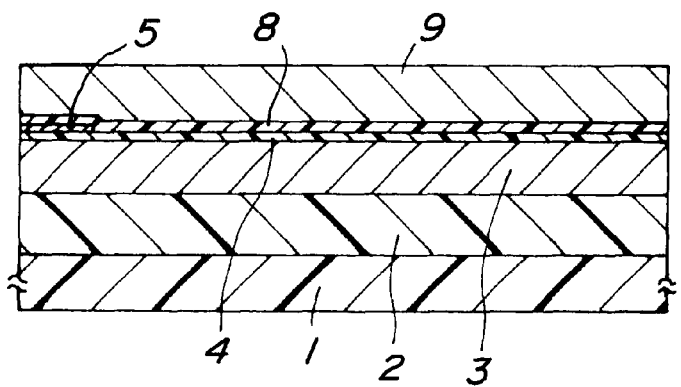
Figure 6B:
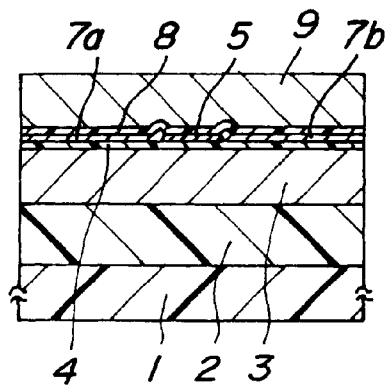
Figure 7B:
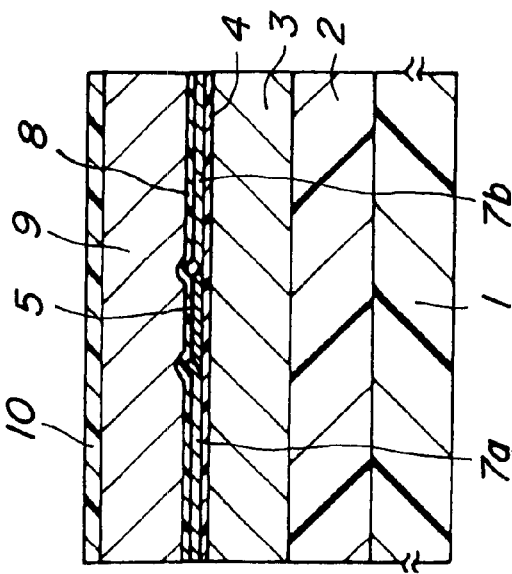
Figure 7A:
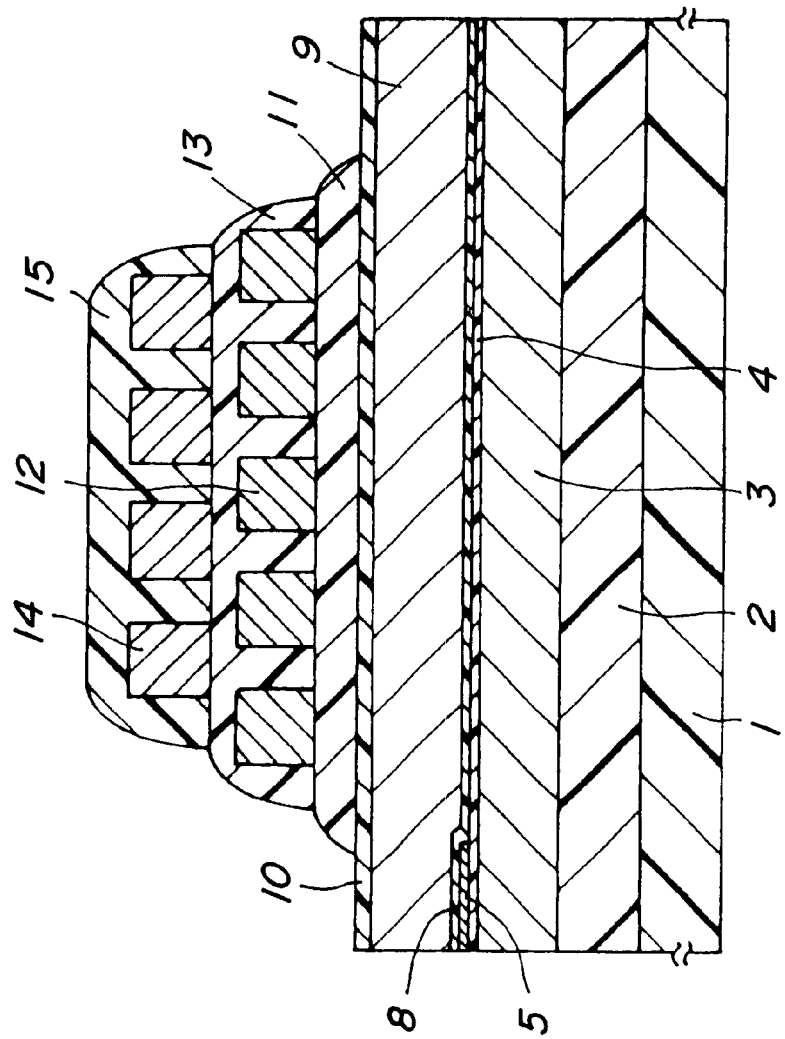
Figure 8B:
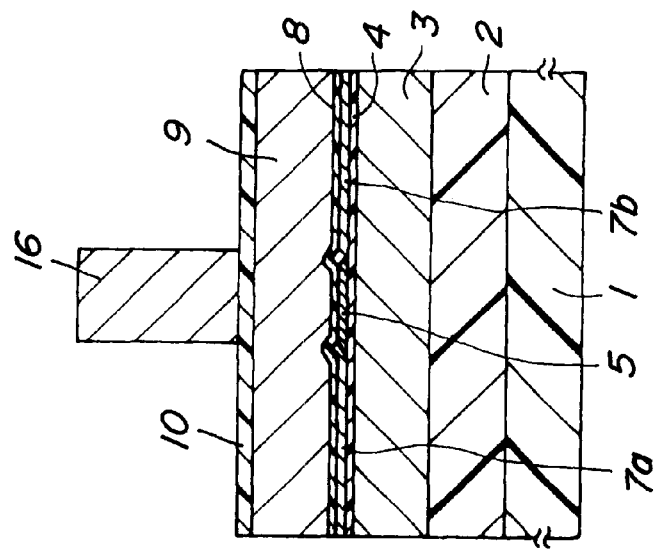
Figure 8A:
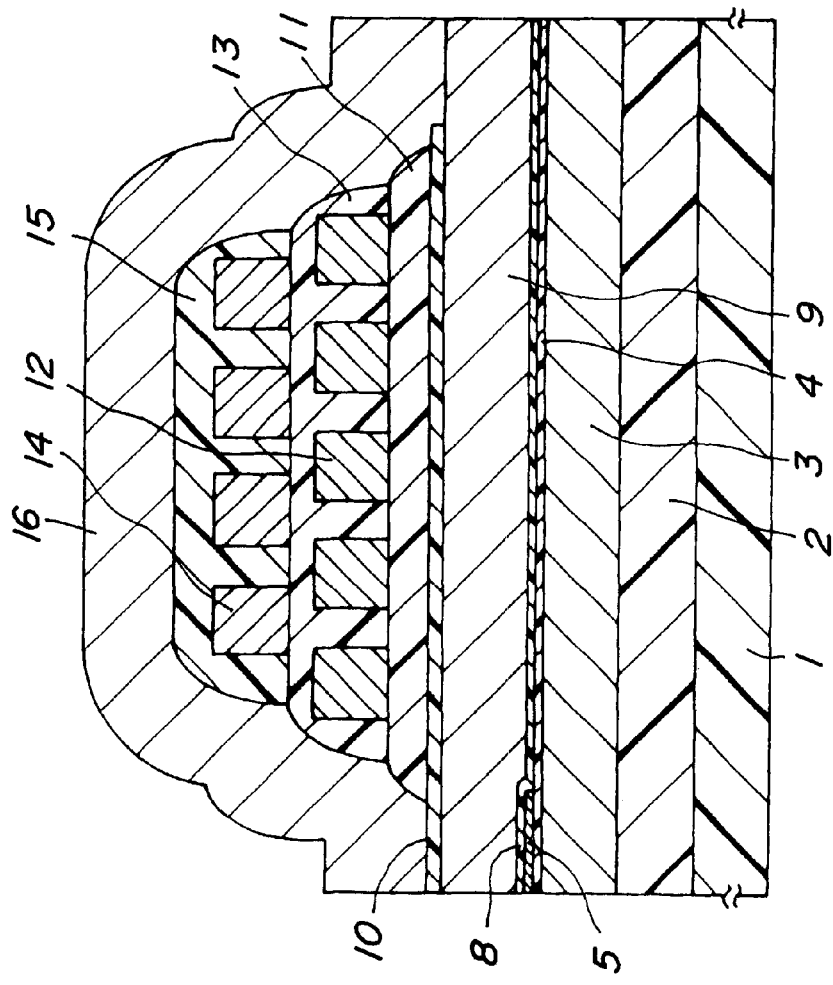

Hereinafter, the first embodiment of the composite type thin film magnetic head and the manufacturing method of the same will be described, with reference to FIGS. 10–23. In FIGS. 10, 11, 13, 14, 16, 18, 20, 21 and 22, the reference "A" depicts a cross sectional view cut away along the plane perpendicular to the ABS, and the reference "B" depicts a cross sectional view cut away along the plane parallel to the ABS. Moreover, in the composite type thin film magnetic head of thin embodiment, on a substrate is formed a reading magnetoresistive effective type thin film magnetic head, on which a writing inductive type thin film magnetic head is stacked.

First of all, as shown in FIG. 10, an insulating layer 22 made of alumina is formed in a thickness of about 3–5 $\mu$m on one surface of a substrate body 21 made of AlTiC. The substrate body 21 and the insulating layer 22 are called as "substrate 23" or "wafer 23" in this specification. Moreover, in this specification, an "insulating layer" means a film having at least an electrical insulation and does not always mean a film having a non-magnetism. However, a material having a non-magnetism as well as an electrical insulation such as alumina is generally used, so an insulating layer often means a non-magnetic layer.

In a practical manufacture, many composite type thin film magnetic heads are formed on a wafer, arranged in matrix, and the wafer is cut to plural bars. Then, the sides of each bar are polished to form its ABS, and lastly, the bar is cut out to obtain each composite type thin film magnetic head. Thus, in this process, the ends of the thin film magnetic head does not appear, but for convenience of explanation, the ends are shown.

Next, as shown in FIGS. 11 and 12, a first and a second conductive layers 24a, 24b having desired shapes to constitute leads for a magnetoresistive element are formed, by sputtering a Cu material in a thickness of 0.5–1.0 $\mu$m, on the insulating layer 22 in the substrate 23. Then, a first through a fourth conductive plugs 25a through 25d are formed, by electro-plating a Cu material in a thickness of 2–3 $\mu$m, on the parts to be connected to the contacting pads to connect the conductive layers to the magnetoresistive layer and outside.

Thus, the conductive layers 24a and 24b double as seed layers in the electroplating.

In FIG. 12, FIG. 12A is a plan view and FIG. 12B is a cross sectional view taken on line "A—A" of FIG. 12A. As is apparent from FIG. 12, FIG. 11 are cross sectional views taken on line "B—B" slightly approaching to the first conductive layer, not on intermediate line between the first and the second conductive layers 24a and 24b. Furthermore, in FIG. 12, the outline of a bottom shield layer (a first magnetic member) 27 are shown as a broken line.

Next, as shown in FIG. 13, an insulating layer 26 is formed in a thickness of 0.5–1.0 μm on the insulating layer 22 in the substrate 23, the conductive layers 24a, 24b and the conductive plugs 25a through 25d, and a seed layer is formed, of permalloy, in a thickness of 50 nm to form a bottom shield layer for the magnetoresistive effective type thin film magnetic head by electroplating. Thereafter, the seed layer is ion-milled to a desired pattern, and the bottom shield layer 27 is formed, of permalloy, in a thickness of about 3 μm by electroplating. As is apparent from FIG. 12A showing the plane shape of the bottom shield layer 27, the bottom shield layer is so formed as to cover the first and the second conductive layers 24a and 24b entirely.

Subsequently, as shown in FIGS. 14 and 15, an insulating layer made of alumina is formed in a thickness of 3–4 μm over the surface of the assembly, and thereafter, is polished to expose the surfaces of the conductive plugs 25a through 25d. Then, the exposed surfaces are made the same level as the surface of the bottom shield layer 27 to flatten the surface of the assembly entirely. The polishing is carried out by a mechanical polish, but in this embodiment, it is done by using chemical-mechanical polish (CMP). An alumina insulating layer 28 after polishing is shown in FIG. 15. FIG. 15B is a cross sectional view taken on line "A-A" of FIG. 15A, and FIG. 14A is a cross sectional view taken on line "B—B" of FIG. 15A.

In this invention, as shown in FIGS. 14 and 15, since the alumina insulating layer 26 having a thick thickness of 0.5–1.0 μm is intervened between the first and the second conductive layers 24a, 24b constituting the leads for the magnetoresistive layer and the bottom shield layer 27, electrical short circuits due to particles or pin-holes does not occur between these conductive layers and the bottom shield layer, so that the insulation therebetween becomes excellent.

Subsequently, as shown in FIGS. 16 and 17, a bottom shield gap layer 29 is formed, of aluminum nitride or alumina, in a thickness of 40–100 nm on the flattened surface, and a GMR layer 30 is formed in a thickness of several ten nm by sputtering. Then, a resist pattern is formed in a shape to be lifted off easily, for example a T-shape, and thereafter a pattern for the magnetoresistive element is formed by an Ar-based ion milling. Subsequently, a first and a second drawing electrode layers 31a and 31b for the GMR layer 30 are formed in a thickness 80–150 nm with the same photomask, and are connected to the first and the second conductive layers 24a and 24b via the first and the second conductive plugs 25a and 25b.

For enforcing the uniaxial anisotropy of the GMR film and thereby reducing its Barkhausen noise and its resistance, the drawing electrode layers 31a and 31b are preferably composed of at least one magnetic material and at least one conductive material which are laminated. In this embodiment, they are composed of a laminated body of TiW/CoPt/TiW/Ta/Au. Moreover, by providing the first and the second conductive plugs 25a and 25b extremely nearby the GMR layer 30, the lengths of the drawing electrode layers 31a and 31b to connect the both ends of GMR layer to the first and the second conductive plugs can be shortened. Thus, the resistance of the whole leads for the magnetoresistive element can be made smaller.

Subsequently, as shown in FIGS. 18 and 19, a top shield gap layer 32 is formed, of aluminum nitride or alumina, in a thickness of 50 100 nm by sputtering, and thereafter, a magnetic layer (called as a "bottom pole" in this embodiment) 33 doubling as a top shield layer in the magnetoresistive effective type thin film magnetic head and a bottom pole in the inductive type thin film magnetic head is formed, of permalloy, in a thickness of 3–4 μm. Then, an insulating layer 36 is formed, of alumina or silicon oxide, in a thickness of 4–6 μm over the assembly, and is polished by CMP to expose the flat surface of the bottom pole 33.

Before forming the bottom pole 33, openings 34a and 34b are formed at the parts of the shield gap layers 29 and 32 corresponding to the conductive plugs 25c and 25d, and magnetic material parts electrically connected to the conductive plugs are formed. Since the magnetic material parts work as conductors to be connected to contacting pads to connect the conductive plugs to an external circuit, they are called as a "first conductive layer 35a" and a "second conductive layer 35b". For electrical insulating between the first and the second conductive layers 35a, 35b and between these conductive layers and the bottom pole 33, the above insulating layer 36 is formed.

Next, as shown in FIG. 20, a write gap film 37 made of alumina or silicon oxide is formed, corresponding to a give pattern, in a thickness of 0.2–0.3 μm on the exposed surface of the bottom pole 33. Then, on the write gap film 37 is formed, corresponding to a give pattern, an insulating layer 38 in a thickness of 1–2 μm, on which a first layer-thin film coil 39 is formed in a thickness of 2–3 μm by a plating method. In FIG. 20, for clarifying the figure, the bottom shield gap layer 29 and the top shield gap layer 32 are depicted as they are integrated.

At the same time when the thin film coil 39 is formed, a third and a fourth conductive layers 39a and 39b, one ends of which are connected to the first and second conductive layers 35a and 35b connected to the conductive plugs 25c and 25d and the other ends of which are extended to the area nearby the contacting pads, are formed. Hereupon, the fourth conductive layer 39b dose not appear in FIG. 20.

The above insulating layer 38 may be formed of an organic insulating material such as a photoresist film or an inorganic insulating material such as a alumina, silicon oxide, silicon nitride. For example, in the case of forming of the inorganic insulating material, the layer can be selectively etched into a desired pattern by photolithography and the thus obtained pattern edge is tapered. The tapered pattern edge defines a throat height. In the case of forming of the organic insulating material, the pattern edge defines the throat height.

Figure 22:
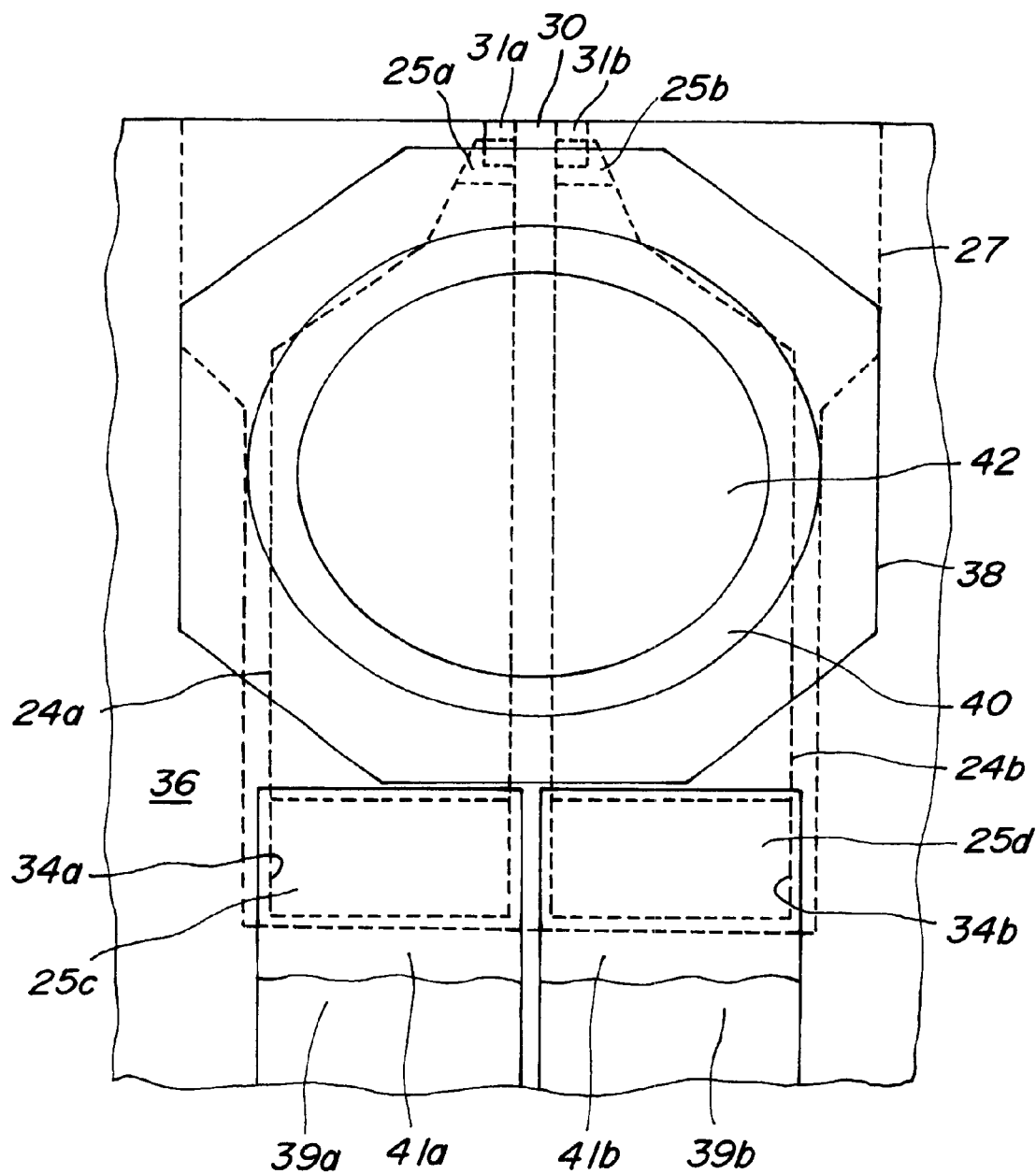
FIG. 22 is a plan view in the step of FIG. 21, FIGS. 23A and 23B are cross sectional views showing the next step.

Subsequently, as shown in FIGS. 21 and 22, the area around the first layer-thin film coil 39 is embedded by an insulating layer 40 made of a photoresist, and thereafter, a second layer-thin film 41 is formed so as to be insulation-separated and supported with an insulating layer 42. Then, the whole assembly is cured at about a temperature of 200° C. to flatten the top surface of the thin film coil.

Next, as shown in FIG. 23, a top pole 43, made of a magnetic material with a high saturated magnetic flux density such as NiFe (50%, 50%) or FeN, having a magnetic pole portion to determine a track width of a recording head is formed in a given pattern having a thickness of almost 3

μm by a plating method, and the part of the write gap layer 37 around the magnetic pole portion is dry-etched by using the magnetic pole portion itself. Then, the part of the bottom pole 33 exposed through the dry etching is removed in its thickness direction, for example by 0.3–0.5 μm thickness, by ion milling, to form a trim structure. Then, an overcoat layer 44 made of alumina is formed over the assembly.

In this embodiment, although the top pole 43 made of the magnetic material having a high saturated magnetic flux density such as NiFe (50%, 50%) or FeN is formed in a given pattern by the plating method, it may be formed by dry etching after forming it by sputtering. Moreover, since the recording track width is determined by the magnetic pole portion width of the top pole 43, it is narrowed to 0.5–1.2 μm.

FIGS. 24 to 32 shows successive manufacturing steps in a second embodiment of the composite type thin film magnetic head according to the present invention.

As shown in FIG. 24, an insulating layer 22 made of alumina is deposited in a thickness of about 3–5 μm on one surface of a substrate body 21 made of AlTiC to form a substrate 23.

Next, as shown in FIG. 25, a first and a second conductive layers 24a and 24b (24b not shown in the figure) are formed into a desired shape on the insulating layer 22 by sputtering a Cu material into a thickness of 0.5–1.0 μm. Then, a first through a fourth conductive plugs 25a through 25d (25b and 25d not shown in the figures) are formed in a thickness of 2–3 μm by electroplating a Cu material using the conductive layers as seed layers, and an insulating layer 26 made of alumina is formed in a thickness of 0.5–1.0 μm on the conductive plugs. Subsequently, a seed layer made of permalloy is formed in a desired pattern having a thickness of about 50 nm, and thereafter, a bottom shield layer (a first magnetic layer) 27 is formed, of permalloy, in a thickness of about 3 μm, by electroplating.

Next, as shown in FIG. 26, the surfaces of the conductive plugs 25a to 25d are exposed by polishing with CMP the whole surface of the assembly, and are leveled to the surface of the bottom shield layer 27 to flatten the whole surface of the assembly. In this embodiment, since the alumina insulating layer 26 having a thick thickness of 0.5–1.0 μm is intervened between the first and second conductive layers 24a, 24b and the bottom shield layer 27, electrical short circuits due to particles or pin-holes does not occur between the these conductive layers and the bottom shield layer, resulting in the insulation therebetween becoming excellent.

Subsequently, as shown in FIG. 27, a bottom shield gap layer 29 is formed, of aluminum nitride or alumina, in a thickness of 40–100 nm, and a GMR layer 30 is formed in a thickness of several ten nm by sputtering. Then, a resist pattern is so formed as to have a shape to be lifted off easily, for example, a T-shape, and is ion-milled by using an Ar based gas to form a pattern for a magnetoresistive element. Subsequently, a first and a second drawing electrode films 31a and 31b (31b not shown in the figure) for the GMR layer 30 are formed, of a laminated body of TiW/CoPt/TiW/Ta/Au, in a thickness of 80–150 nm by using the same photomask, and are connected to the first and second conductive layers 24a and 24b via the first and second conductive plugs 25a and 25b. Then, a top shield gap layer 32 is formed, of aluminum nitride or alumina, in a thickness of 50–100 nm, and thereafter, a bottom pole 33 is formed, of permalloy, in a thickness of 3–4 μm.

Before forming the bottom pole 33, openings 34a and 34b are formed at the parts of the shield gap layers 29 and 32 corresponding to the conductive plugs 25c and 25d, and a first and a second conductive layer 35a and 35b (35b not shown in the figure) electrically connected to these conductive plugs are formed. In this embodiment, the space between the first and second conductive layers 35a, 35b and the bottom pole 33 is not embedded by an insulating material, constituting a space 51.

Next, as shown in FIG. 28, by selectively forming of a magnetic material into a thickness of 1–2 μm, a bottom pole chip 52a to define a throat height for a recording magnetic head, a conductive layer 52b connected to the first and second conductive layers 35a and 35b and a connecting part 52c with a top pole to be formed later are formed.

Next, as shown in FIG. 29, an insulating layer 53 made of alumina or silicon oxide is formed over the assembly, and is polished to expose the surface of the magnetic layer. Then, a write gap layer 54 made of alumina or silicon oxide is formed, corresponding to a given pattern, in a thickness of 0.15–0.3 μm on the surface of the exposed bottom pole chip 52a and the insulating layer 53. Hereupon, the write gap layer 54 is not formed on the surface of the connecting part 52c between the conductive layer 52b and the top pole.

Subsequently, as shown in FIG. 30, by depositing a magnetic material having a high saturated magnetic flux density in a thickness of 3 μm, a pole chip 55a to define the track width of the recording magnetic head is formed, and besides, a conductive layer 55b and a connecting part 55c are formed on the conductive layer 52b and the connecting part 52c at the same time. Moreover, the part of the write gap layer 54 nearby the pole chip 55a is selectively removed by dry-etching with the pole chip 55a as a mask, and the bottom pole chip 52a exposed through the ion milling is removed by a 0.3–0.5 μm depth to form a trim structure. Then, a first layer-thin film coil 56 is formed by a plating method.

Subsequently, as shown in FIG. 31, an insulating layer 57 made of alumina is formed in a thickness of 3–4 μm so as to cover the first layer-thin film coil 56, and its surface is flattened by CMP. Thereafter, a second layer-thin film coil 58 is formed on the insulating layer 57. At the same time when the thin film coil 58 is formed, a conductive layer 58a is formed so as to be connected to the conductive layer 56.

Next, as shown in FIG. 32, a second layer-thin film coil 58 is covered with a photoresist insulating layer 42, and the whole assembly is cured at a temperature of 200° C. to flatten the top surface of the thin film coil. Thereafter, a top pole 59 is formed so that its end in the ABS-side may be receded from the ABS, and last, an overcoat layer 44 is formed.

In this embodiment, since the forefront of the top pole 59 is receded from the ABS, the writing by the magnetic flux leaked from the forefront is prevented. Moreover, since the top pole chip 55a is extended to the backward from the bottom pole chip 52a, even if the forefront of the top pole 59 is receded from the ABS, the top pole and the top pole chip are contacted by a large area, resulting in a magnetic flux not saturating in the contacting area.

In the above second embodiment, although the bottom pole chip 52a and the top pole chip 55a are formed of a magnetic material having a high saturated magnetic flux density, NiFe (20%, 50%), they may be formed of an amorphous magnetic material such as NiFe (50%, 50%), FeN or Fe—Co—Zr. Besides, it may be formed of a laminated body of these magnetic material layers. The bottom pole 33 may be formed of the laminated body of NiFe (20%, 50%) and the magnetic material layers.

FIG. 33 shows a structure of a third embodiment in the composite type thin film magnetic head according to the present invention. In this embodiment, as the second embodiment as above-mentioned, a first and a second conductive layers 24a and 24b, and a first through a fourth conductive plugs 25a through 25d are formed at their both ends. Then, an alumina insulating layer 26 is formed over the assembly, and thereafter, a bottom pole 33 is formed by electroless plating or sputtering and patterning a permalloy material. Next, the surface of the bottom pole 33 is flattened and a bottom pole chip 52a is formed on the bottom pole chip. Thereafter, an alumina insulating layer 61 is formed in a thickness of 0.3–0.8 μm, and a first layer-thin film coil 56 is formed on the alumina insulating layer. Then, an alumina insulating layer 57 is formed so as to embed the space around the first layer-thin film coil, and is flattened by CMP.

Subsequently, a write gap layer 54 is formed in a thickness of 0.2–0.3 μm in the flattened surface, and a top pole chip 55a is formed in a thickness of 2–2.5 μm. Then, an alumina insulating layer 62 is formed in a thickness of 0.3–0.8 μm, and a second layer-thin film coil 58 is formed on the alumina insulating layer 62. Moreover, an alumina insulating layer 63 is formed in a thickness of 3–4 μm so as to embed the space around the second layer-thin film coil, and is flattened by CMP. Then, a top pole 59 is formed on the alumina insulating layer so that its forefront may be receded from the ABS, and lastly, an overcoat layer 44 is formed over the assembly. Hereupon, at the same time when the thin film coil 58 is formed, a conductive layer 58a is formed.

In this embodiment, since the first layer-thin film coil 56 is formed under the write gap layer 54, the surface of the insulating layer 63 to support the second thin film coil 58 in insulating separation and the surface of the top pole chip 55a are flattened, and the top pole 59 is formed flat on the flattened surfaces, the top pole can be finely processed easily and precisely.

FIG. 34 shows a fourth embodiment of the composite type thin film magnetic head according to the present invention. In the thin film magnetic head of this embodiment, compared with the one in the third embodiment in FIG. 33, the forefront of the flattened top pole 59 is extended to ABS, and except that point, its structure is similar to the one in the third embodiment.

Figure 35A:
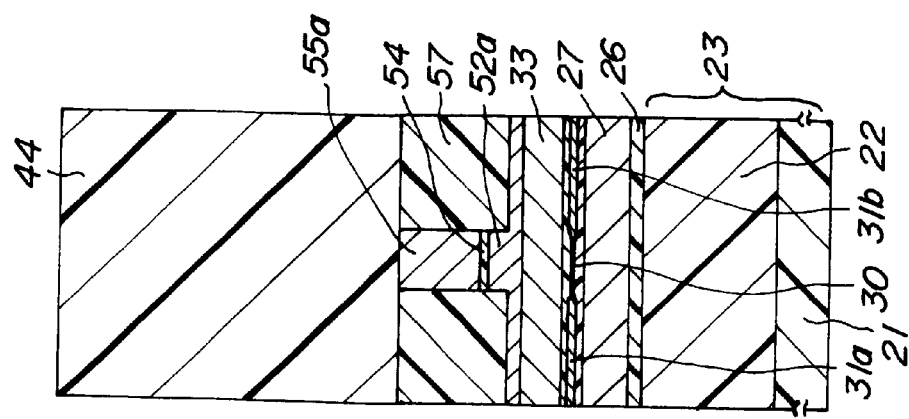
FIGS. 35A and 35B are cross sectional views showing a fifth embodiment-thin film magnetic head according to the present invention.
Figure 35B:
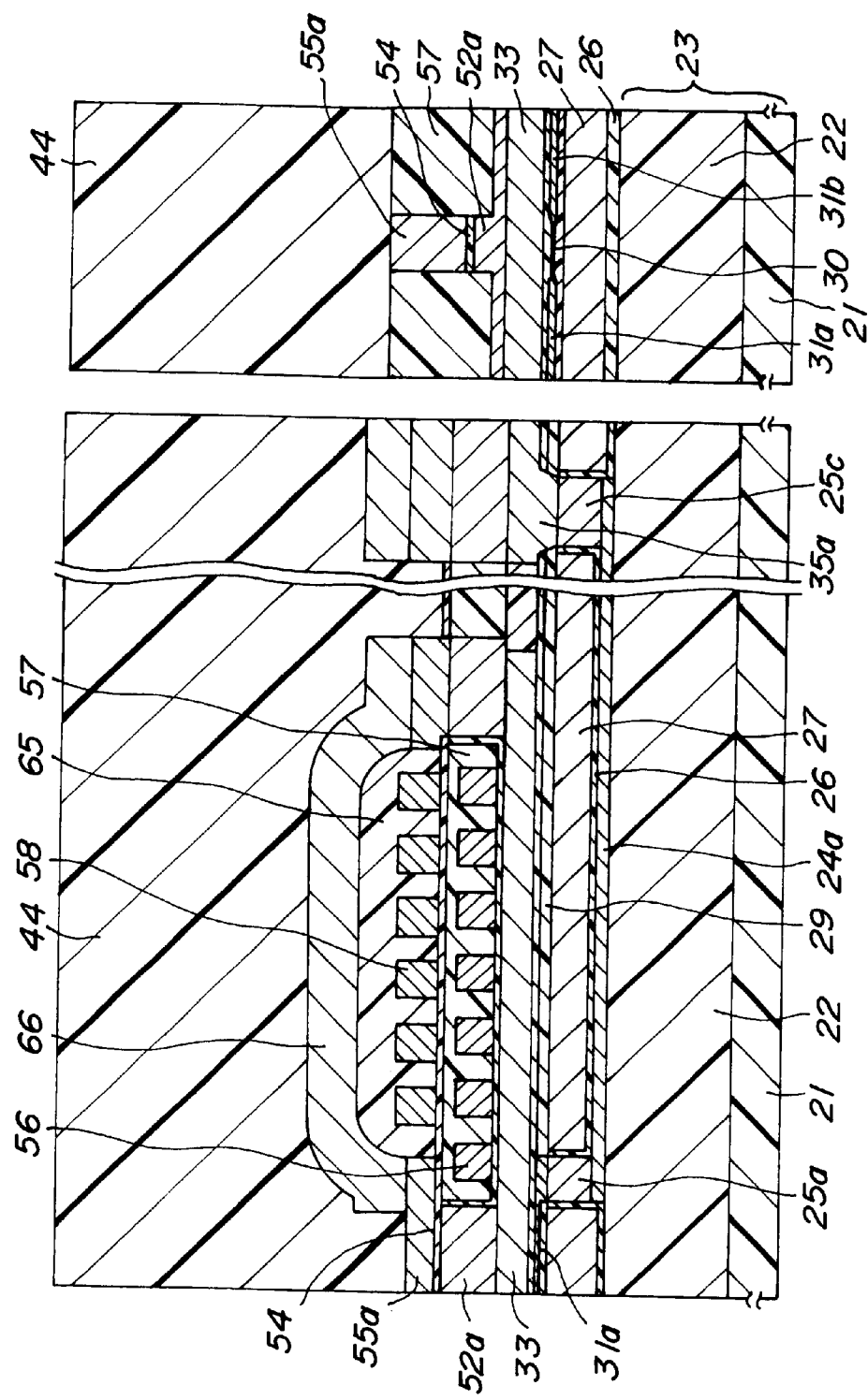

FIG. 35 shows a fifth embodiment of the composite type thin film magnetic head. In the thin film magnetic head of this embodiment, compared with the one in the third embodiment in FIG. 33, the second layer-thin film coil 58 is formed and supported with the insulating layer 65 in insulating separation, and cured at a temperature of 200° C. to flatten the upper surface of the insulating layer. Then, the top pole 66 is formed on the insulating layer so that its forefront may be receded from the ABS, and lastly, the overcoat layer 44 is formed.

The invention is not limited to the above embodiments, and various changes and modifications may be made without departing from the spirit and scope of the invention. For example, in the above embodiments, the composite type thin film magnetic head in which the inductive type thin film magnetic head is stacked on the magnetoresistive effective type thin film magnetic head is produced, but the composite type thin film magnetic head may be composed of only the magnetoresistive effective type thin film head.

Moreover, in the above embodiment, the magnetoresistive element is composed of the GMR element, but it may be of an AMR element.

Furthermore, the dimension of each part, the materials and the manufacturing processes in the above embodiments are cited as examples, so they may be variously modified.

According to the thin film magnetic head and the manufacturing method of the present invention, since the first and second conductive layers constituting the better part of the electric connecting member to connect to outside the magnetoresistive layer constituting the reading magnetoresistive effective type thin film magnetic head is positioned between the substrate and the first magnetic member constituting the bottom shield, these conductive layers can be formed sufficiently thick to reduce their resistances. Thus, the minute output signals from the magnetoresistive element can be read precisely.

In addition, since the insulating layer having a thick thickness is intervened between those conductive layers and the first magnetic member, the insulation therebetween becomes excellent. Needless to say, not only the shield gap layer, but also the above insulating layer and the first magnetic member are intervened between those conductive layers and the second magnetic member, so that the insulations therebetween become good.

Furthermore, on account of the above good insulations, the shield gap film can be thinner and the thermal asperity can be improved, resulting in the enhancement of the characteristics of the magnetoresistive element.

In the embodiment in which the above conductive layers are connected to the one ends of the conductive plugs provided near the magnetoresistive element and the other ends of the conductive plugs are connected to the magnetoresistive element via the drawing electrode film, even if for developing the characteristics of the magnetoresistive element, a drawing electrode film having a relatively high resistance is employed, its length can be shortened. Thus, the whole lead for the magnetoresistive element can be lowered.

Moreover, as is shown in the second, the third and the fifth embodiments, in the case of forming the third magnetic layer constituting the top pole is formed so that its forefront may be receded from the ABS, the side-write in the top pole does not occur. Consequently, the track width can be narrowed and the surface recording density can be enhanced.

Furthermore, as is shown in the third and the fourth embodiments, in the case of forming the bottom pole chip and the first layer-thin film coil is formed so as to be accommodated in the thickness of the bottom pole chip, the height of the thin film coil can be decreased and the top surface of the second layer-thin film coil and the upper surface of the top pole chip can be flattened. Consequently, on the flattened surfaces is formed the top pole in a desired pattern easily and precisely.

In this way, since the thin film coil can be formed on the flattened surfaces, the coil winding can be made fine and thereby its occupied area for the whole magnetic head can be diminished. As a result, the magnetic circuit length between the bottom pole and the top pole can be shortened and the characteristics of the recording magnetic head can be enhanced.

What is claimed is:

1. A composite type thin film magnetic head in which a reading magnetoresistive effective type thin film magnetic head and a writing inductive type thin film magnetic head are stacked, comprising:
   a substrate made of an electrical insulating material,
   a first magnetic member constituting one shield in a magnetoresistive effective type thin film magnetic head, supported by the substrate,
   a magnetoresistive layer formed so as to be embedded in a shield gap layer on the opposite surface of the first magnetic member to the surface supported by the substrate, a second magnetic member constituting the other shield of the magnetoresistive effective type thin film magnetic head and one pole of the inductive type thin film magnetic head, formed on the opposite surface of the shield gap layer to the first magnetic member, a write gap film formed at least on the opposite surface to the shield gap layer of the magnetic pole portion in the second magnetic member, a third magnetic member constituting the other pole of the inductive type thin film magnetic head, opposing to the second magnetic member via the write gap film in a magnetic pole portion including an air bearing surface, magnetically connected to the second magnetic member in a position apart from the air bearing surface, a thin film coil, its part being arranged in insulating separation with an insulating material so as to pass through the closed magnetic circuit composed of the second and the third magnetic member, and an electrical connecting member for the magnetoresistive layer, having a first and a second conductive layers extending in insulating separation between the substrate and the first magnetic member.

2. A composite type thin film magnetic head as defined in claim 1, wherein one ends of a first and a second conductive plugs extending throughout the first magnetic member are connected to the ends of the first and second conductive layers in the magnetoresistive layer-side, respectively, and the other ends of the first and second conductive plugs are connected to the ends of the magnetoresistive layer via a first and a second drawing electrode layers, respectively.

3. A composite type thin film magnetic head as defined in claim 2, wherein the first and second conductive layers and the first and second conductive layers are made of a Cu material.

4. A composite type thin film magnetic head as defined in claim 3, wherein the thicknesses of the first and second conductive layers are 0.5–1.0 μm.

5. A composite type thin film magnetic head as defined in claim 2, wherein each of the first and the second drawing electrode layers are composed of a laminated body of a magnetic material layer having at least one layer and a conductive material layer having at least one layer.

6. A composite type thin film magnetic head as defined in claim 5, wherein each of the first and the second drawing electrode layers are composed of a laminated body of TiW/CoPt/TiW/Au.

7. A composite type thin film magnetic head as defined in claim 2, wherein a third and a fourth conductive plugs are provided in the opposite side of the first and second conductive layers to the first and second conductive plugs-formation side, and are connected to a first and a second contacting pads for connection to an external circuit via a first and a second conductive member extending to the opposite side of the first magnetic member to the substrate.

8. A composite type thin film magnetic head as defined in claim 7, wherein the first and the second conductive member are composed of parts made of the same magnetic material as at least a part of the second magnetic member and of the same conductive material as at least a part of the thin film coil, respectively, and the parts made of the same magnetic material and conductive material are formed at the same time when the second magnetic member and the thin film coil are formed, respectively.

9. A composite type thin film magnetic head as defined in claim 7, wherein the first and the second conductive layers are composed of the parts made of the same magnetic material as at least a part of the second magnetic member, of the same magnetic member as at least a part of the third magnetic member and of the same conductive material as at least a part of the thin film coil, respectively, and the parts made of the same magnetic material and conductive material are formed at the same time when the second, the third magnetic member and the thin film coil are formed, respectively.

10. A composite type thin film magnetic head as defined in claim 1, wherein the first magnetic member is composed of a first magnetic layer and the second magnetic member is composed of a second magnetic layer formed on the opposite surface to the substrate of the shield gap layer, and the third magnetic member is composed of a third magnetic layer having a magnetic pole portion opposing to the second magnetic layer via the write gap layer, formed on the opposite surface of the write gap layer to the second magnetic layer, magnetically connected to the second magnetic layer in the opposite side to the air bearing surface.

11. A composite type thin film magnetic head as defined in claim 1, wherein the first magnetic member is composed of a first magnetic layer and the second magnetic member is composed of a second magnetic layer formed on the opposite surface of the shield gap layer to the substrate and a first pole chip formed on the opposite surface of the second magnetic layer to the shield gap layer, and the third magnetic member is composed of a second pole chip formed so as to oppose to the first pole chip via the write gap layer and a third magnetic layer magnetically connecting to the opposite surface of the second pole chip to the write gap and magnetically connecting the second magnetic layer in the opposite side to the air bearing surface.

12. A composite type thin film magnetic head as defined in claim 11, wherein the first and second pole chips are made of a magnetic material having a larger saturated magnetic flux than that in the first and second magnetic layers.

13. A composite type thin film magnetic head as defined in claim 11, wherein the forefront of the third magnetic layer is exposed to the air bearing surface.

14. A composite type thin film magnetic head as defined in claim 11, wherein the forefront of the third magnetic layer is receded from the air bearing surface.

15. A composite type thin film magnetic head as defined in claim 11, wherein the thin film coil is composed of a first layer-thin film coil and a second layer-thin film coil, the first layer-thin film coil being formed within the thickness of the second pole chip, and the surfaces of the first layer- and the second layer-thin film coils are flattened.

16. A composite type thin film magnetic head as defined in claim 11, wherein the thin film coil is composed of a first layer-thin film coil and a second layer-thin film coil, and the first layer-thin film coil is formed within the thickness of the first pole chip to flatten the surfaces of the first layer-thin film coil and the first pole chip, and the second layer-thin film coil is formed within the thickness of the second pole chip to flatten the surfaces of the second layer-thin film coil and the second pole chip are flattened.

17. A composite type thin film magnetic head as defined in claim 16, wherein the third magnetic layer is formed flat on the flattened surfaces of the second pole chip and the second layer-thin film coil.

* * * * *